US007769740B2

(12) United States Patent
Martinez et al.

(10) Patent No.: US 7,769,740 B2
(45) Date of Patent: Aug. 3, 2010

(54) SYSTEMS AND METHODS OF RANKING ATTENTION

(75) Inventors: Ronald Martinez, San Francisco, CA (US); Marc Eliot Davis, San Francisco, CA (US); Christopher William Higgins, Portland, OR (US); Joseph James O'Sullivan, Oakland, CA (US)

(73) Assignee: Yahoo! Inc., Sunnyvale, CA (US)

( * ) Notice: Subject to any disclaimer, the term of this patent is extended or adjusted under 35 U.S.C. 154(b) by 382 days.

(21) Appl. No.: 11/963,374

(22) Filed: Dec. 21, 2007

(65) Prior Publication Data

US 2009/0164450 A1 Jun. 25, 2009

(51) Int. Cl.
*G06F 17/30* (2006.01)
(52) U.S. Cl. ..................... 707/706; 707/709; 707/723
(58) Field of Classification Search .............. 707/706, 707/709, 723
See application file for complete search history.

(56) References Cited

U.S. PATENT DOCUMENTS

| | | | |
|---|---|---|---|
| 2003/0069877 A1* | 4/2003 | Grefenstette et al. ........... 707/2 |
| 2004/0015588 A1* | 1/2004 | Cotte .......................... 709/227 |
| 2004/0148341 A1* | 7/2004 | Cotte .......................... 709/203 |
| 2005/0076060 A1 | 4/2005 | Finn et al. |
| 2005/0108213 A1 | 5/2005 | Riise et al. ...................... 707/3 |
| 2005/0120006 A1* | 6/2005 | Nye .............................. 707/3 |
| 2005/0182824 A1* | 8/2005 | Cotte .......................... 709/217 |
| 2006/0282455 A1 | 12/2006 | Lee et al. |
| 2007/0073641 A1 | 3/2007 | Perry et al. |
| 2007/0130137 A1* | 6/2007 | Oliver et al. .................... 707/5 |
| 2007/0143345 A1* | 6/2007 | Jones et al. ............... 707/104.1 |
| 2008/0005651 A1* | 1/2008 | Grefenstette et al. ........ 715/500 |
| 2008/0114751 A1* | 5/2008 | Cramer et al. ................. 707/5 |
| 2008/0147655 A1* | 6/2008 | Sinha et al. ..................... 707/6 |
| 2009/0281997 A1* | 11/2009 | Jain ............................... 707/3 |

FOREIGN PATENT DOCUMENTS

WO    WO 2007113546 A1    10/2007

OTHER PUBLICATIONS

Backstrom et al., *Spatial Variation in Search Engine Queries*, WWW. 2008, Beijing, China (Apr. 21-25, 2008).
Gan et al., *Analysis of Geographic Queries in a Search Engine Log*, LocWeb 2008, Beijing, China (Apr. 22, 2008).
Jones et al., *Geographic Intention and Modification in Web Search*, International Journal of Geographical Information Science, vol. 22, No. 3, pp. 1-20 (Jul. 2008).
Sanderson et al., *Analyzing Geographic Queries*.
Notification of Transmittal of the International Search Report And The Written Opinion of the International Searching Authority, Or the Declaration dated Jun. 29, 2009; 11 pages.

* cited by examiner

*Primary Examiner*—Don Wong
*Assistant Examiner*—Hanh B Thai
(74) *Attorney, Agent, or Firm*—James J. DeCarlo; Greenberg Traurig, LLP

(57) ABSTRACT

The disclosure describes systems and methods of ranking user interest in physical entities based on the attention given to those entities as determined by an analysis of communications from devices over multiple communication channels. The attention ranking systems allow any "Who, What, When, Where" entity to be defined and ranked based, at least in part, on information obtained from communications between users and user proxy devices. An entity rank is generated for entity known to the system in which the entity rank is derived from the information in communications that are indicative of user actions related to the entity. The entity ranks are then used to modify the display of information or data associated with the entities. The system may also generate a personal rank for each entity based on the relation of the entity to a specified user.

19 Claims, 9 Drawing Sheets

SYSTEMS AND METHODS OF RANKING ATTENTION

BACKGROUND

A great deal of information is generated when people use electronic devices, such as when people use mobile phones and cable set-top boxes. Such information, such as location, applications used, social network, physical and online locations visited, to name a few, could be used to deliver useful services and information to end users, and provide commercial opportunities to advertisers and retailers. However, most of this information is effectively abandoned due to deficiencies in the way such information may be captured. For example, and with respect to a mobile phone, information is generally not gathered while the mobile phone is idle (i.e., not being used by a user). Other information, such as presence of others in the immediate vicinity, time and frequency of messages to other users, and activities of a user's social network are also not captured effectively. There exists a need for methods, systems and apparatus to collect and communicate data associated with users and their electronic devices.

SUMMARY

The disclosure describes systems and methods for using data collected and stored by multiple devices on a network in order to improve the performance of the services provided via the network. In this disclosure, systems and methods of ranking user interest in physical entities are described. The systems and methods are based on the attention given to entities as determined by an analysis of communications from devices over multiple communication channels. The attention ranking systems allow any "Who, What, When, Where" entity to be defined and ranked based, at least in part, on information obtained from communications between users and user proxy devices. An entity rank is generated for entity known to the system in which the entity rank is derived from the amount and/or type of information in communications that are indicative of user actions related to the entity. The entity ranks may then used to modify the display of information or data associated with the entities. The system may also generate a personal rank for each entity based on the relation of the entity to a specified user.

One aspect of the disclosure is a method of presenting results of a web page query. The method includes generating a results set of web pages matching the web page query, in which each web page associated with a web rank. For each web page referring to one of a plurality of predefined entities in the content of the web page, the method generates and/or retrieves an entity rank for the web page. The retrieved entity rank being an entity rank associated with the predefined entity referred to in the content of the web page. The entity rank differs from a web rank in that it is a rank of an entity and not a rank of the web page. The entity rank further differs from a web rank in that it is a rank determined based on communications between devices that are not searched by web crawlers. The results set of web pages is then displayed based on the web rank and entity rank for each web page.

The method may further include, for each web page in the results set, generating the web rank based on similarity between the web page query and the content of the web page. In addition, the method may also include generating a combined rank for each web page in the results set from the web rank and entity rank for each web page.

Another aspect of the disclosure is a computer-readable medium encoding computer-readable instructions for a method of ranking physical entities. The method includes defining a plurality of physical entities known to a network and analyzing communications from entity proxies for references to one or more of the defined plurality of physical entities. A relative entity rank for each physical entity is then generated based on the references contained in the communications from the entity proxies. In response to requests to display information about one or more of the physical entities, information is then presented based on the relative entity rank of the one or more physical entities.

Yet another aspect of the disclosure is a computing system comprising one or more processors and memory, in which the following software modules are provided and executable by the processors: a web rank module that collects web data produced by user interactions with web pages; a world rank module that generates an entity rank for each of a set of predefined real-world entities (RWEs), in which each RWE is one of a user, a user proxy device, a location, a legal entity, or a physical object; and an attention rank module that generates an attention rank for at least one web page based on the web rank of the web page and entity rank of at least one RWE associated with the web page. The system may further be provided with a datastore and an entity data collection module connected to the world rank module that collects user data from communications transmitted by the RWEs including a number of communications, a communication channel associated with each communication, and the subject of the communication.

These and various other features as well as advantages will be apparent from a reading of the following detailed description and a review of the associated drawings. Additional features are set forth in the description that follows and, in part, will be apparent from the description, or may be learned by practice of the described embodiments. The benefits and features will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The following drawing figures, which form a part of this application, are illustrative of embodiments systems and methods described below and are not meant to limit the scope of the disclosure in any manner, which scope shall be based on the claims appended hereto.

DETAILED DESCRIPTION

Figure 1:
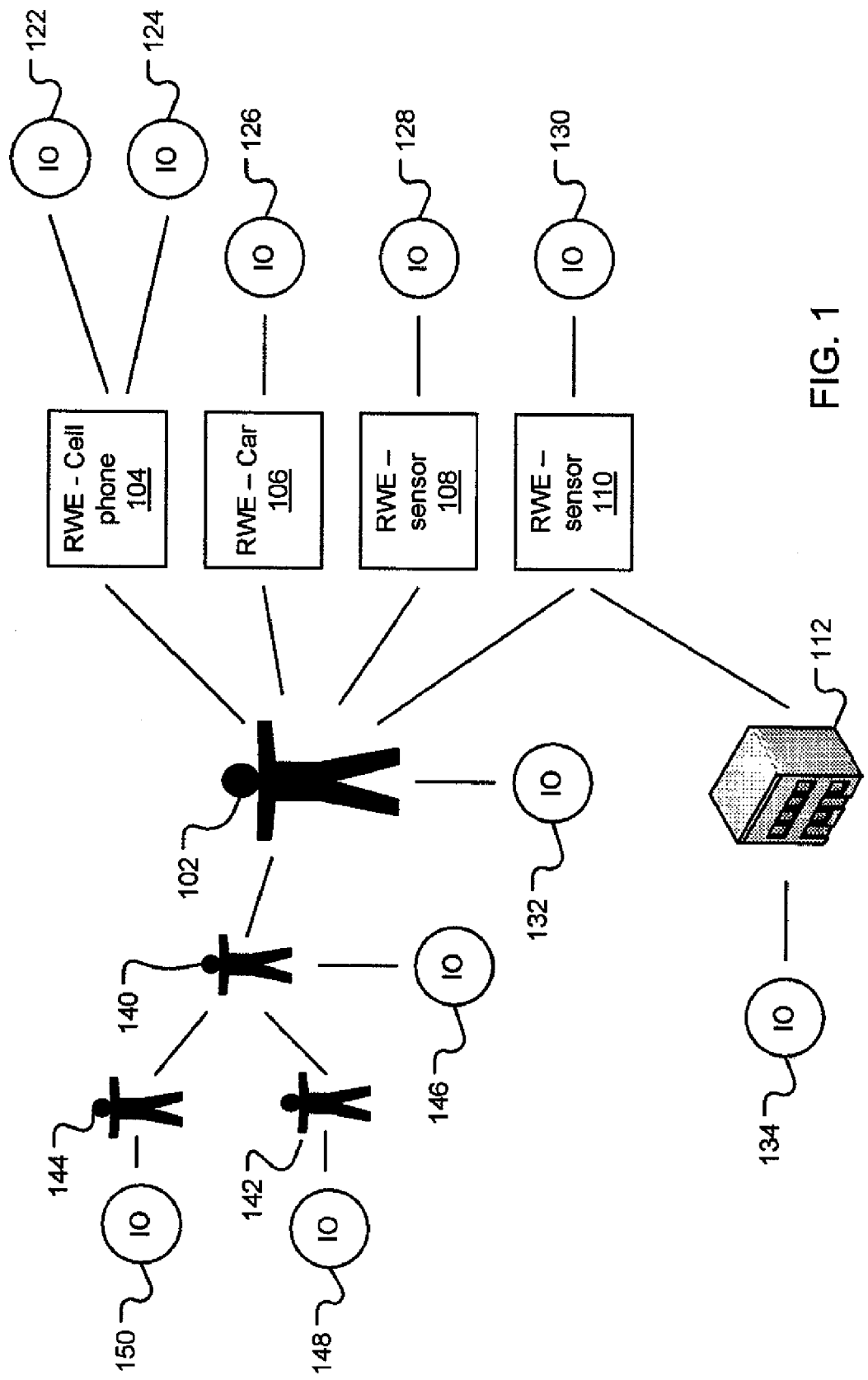
FIG. 1 illustrates an example of the relationships between RWEs and IOs on the W4 COMN.

This disclosure describes a communication network, referred herein as the "W4 Communications Network" or W4 COMN, that uses information related to the "Who, What, When and Where" of interactions with the network to provide improved services to the network's users. The W4 COMN is a collection of users, devices and processes that foster both synchronous and asynchronous communications between users and their proxies. It includes an instrumented network of sensors providing data recognition and collection in real-world environments about any subject, location, user or combination thereof.

As a communication network, the W4 COMN handles the routing/addressing, scheduling, filtering, prioritization, replying, forwarding, storing, deleting, privacy, transacting, triggering of a new message, propagating changes, transcoding and linking. Furthermore, these actions can be performed on any communication channel accessible by the W4 COMN.

The W4 COMN uses a data modeling strategy for creating profiles for not only users and locations but also any device on the network and any kind of user-defined data with user-specified conditions from a rich set of possibilities. Using Social, Spatial, Temporal and Logical data available about a specific user, topic or logical data object, every entity known to the W4 COMN can be mapped and represented against all other known entities and data objects in order to create both a micro graph for every entity as well as a global graph that interrelates all known entities against each other and their attributed relations.

In order to describe the operation of the W4 COMN, two elements upon which the W4 COMN is built must first be introduced, real-world entities and information objects. These distinction are made in order to enable correlations to be made from which relationships between electronic/logical objects and real objects can be determined. A real-world entity (RWE) refers to a person, device, location, or other physical thing known to the W4 COMN. Each RWE known to the W4 COMN is assigned or otherwise provided with a unique W4 identification number that absolutely identifies the RWE within the W4 COMN.

RWEs may interact with the network directly or through proxies, which may themselves be RWEs. Examples of RWEs that interact directly with the W4 COMN include any device such as a sensor, motor, or other piece of hardware that connects to the W4 COMN in order to receive or transmit data or control signals. Because the W4 COMN can be adapted to use any and all types of data communication, the devices that may be RWEs include all devices that can serve as network nodes or generate, request and/or consume data in a networked environment or that can be controlled via the network. Such devices include any kind of "dumb" device purpose-designed to interact with a network (e.g., cell phones, cable television set top boxes, fax machines, telephones, and radio frequency identification (RFID) tags, sensors, etc.). Typically, such devices are primarily hardware and their operations can not be considered separately from the physical device.

Examples of RWEs that must use proxies to interact with W4 COMN network include all non-electronic entities including physical entities, such as people, locations (e.g., states, cities, houses, buildings, airports, roads, etc.) and things (e.g., animals, pets, livestock, gardens, physical objects, cars, airplanes, works of art, etc.), and intangible entities such as business entities, legal entities, groups of people or sports teams. In addition, "smart" devices (e.g., computing devices such as smart phones, smart set top boxes, smart cars that support communication with other devices or networks, laptop computers, personal computers, server computers, satellites, etc.) are also considered RWEs that must use proxies to interact with the network. Smart devices are electronic devices that can execute software via an internal processor in order to interact with a network. For smart devices, it is actually the executing software application(s) that interact with the W4 COMN and serve as the devices' proxies.

The W4 COMN allows associations between RWEs to be determined and tracked. For example, a given user (an RWE) may be associated with any number and type of other RWEs including other people, cell phones, smart credit cards, personal data assistants, email and other communication service accounts, networked computers, smart appliances, set top boxes and receivers for cable television and other media services, and any other networked device. This association may be made explicitly by the user, such as when the RWE is installed into the W4 COMN. An example of this is the set up of a new cell phone, cable television service or email account in which a user explicitly identifies an RWE (e.g., the user's phone for the cell phone service, the user's set top box and/or a location for cable service, or a username and password for the online service) as being directly associated with the user. This explicit association may include the user identifying a specific relationship between the user and the RWE (e.g., this is my device, this is my home appliance, this person is my friend/father/son/etc., this device is shared between me and other users, etc.). RWEs may also be implicitly associated with a user based on a current situation. For example, a weather sensor on the W4 COMN may be implicitly associated with a user based on information indicating that the user lives or is passing near the sensor's location.

An information object (IO), on the other hand, is a logical object that stores, maintains, generates, serves as a source for or otherwise provides data for use by RWEs and/or the W4 COMN. IOs are distinct from RWEs in that IOs represent data, whereas RWEs may create or consume data (often by creating or consuming IOs) during their interaction with the W4 COMN. Examples of IOs include passive objects such as communication signals (e.g., digital and analog telephone signals, streaming media and interprocess communications), email messages, transaction records, virtual cards, event records (e.g., a data file identifying a time, possibly in combination with one or more RWEs such as users and locations, that may further be associated with a known topic/activity/significance such as a concert, rally, meeting, sporting event, etc.), recordings of phone calls, calendar entries, web pages, database entries, electronic media objects (e.g., media files containing songs, videos, pictures, images, audio messages, phone calls, etc.), electronic files and associated metadata.

In addition, IOs include any executing process or application that consumes or generates data such as an email communication application (such as OUTLOOK by MICROSOFT, or YAHOO! MAIL, by YAHOO!), a calendaring application, a word processing application, an image editing application, a media player application, a weather monitoring application, a browser application and a web page server application. Such active IOs may or may not serve as a proxy for one or more RWEs. For example, voice communication software on a smart phone may serve as the proxy for both the smart phone and for the owner of the smart phone.

An IO in the W4 COMN may be provided a unique W4 identification number that absolutely identifies the IO within the W4 COMN. Although data in an IO may be revised by the act of an RWE, the IO remains a passive, logical data representation or data source and, thus, is not an RWE.

For every IO there are at least three classes of associated RWEs. The first is the RWE who owns or controls the IO, whether as the creator or a rights holder (e.g., an RWE with editing rights or use rights to the IO). The second is the RWE(s) that the IO relates to, for example by containing information about the RWE or that identifies the RWE. The third are any RWEs who then pay any attention (directly or through a proxy process) to the IO, in which "paying attention" refers to accessing the IO in order to obtain data from the IO for some purpose.

"Available data" and "W4 data" means data that exists in an IO in some form somewhere or data that can be collected as needed from a known IO or RWE such as a deployed sensor. "Sensor" means any source of W4 data including PCs, phones, portable PCs or other wireless devices, household devices, cars, appliances, security scanners, video surveillance, RFID tags in clothes, products and locations, online data or any other source of information about a real-world user/topic/thing (RWE) or logic-based agent/process/topic/thing (IO).

FIG. 1 illustrates an example of the relationships between RWEs and IOs on the W4 COMN. In the embodiment illustrated, a user 102 is a RWE of the network provided with a unique network ID. The user 102 is a human that communicates with the network via the proxy devices 104, 106, 108, 110 associated with the user 102, all of which are RWEs of the network and provided with their own unique network ID. Some of these proxies may communicate directly with the W4 COMN or may communicate with the W4 COMN via IOs such as applications executed on or by the device.

As mentioned above the proxy devices 104, 106, 108, 110 may be explicitly associated with the user 102. For example, one device 104 may be a smart phone connected by a cellular service provider to the network and another device 106 may be a smart vehicle that is connected to the network. Other devices may be implicitly associated with the user 102. For example, one device 108 may be a "dumb" weather sensor at a location matching the current location of the user's cell phone 104, and thus implicitly associated with the user 102 while the two RWEs 104, 108 are co-located. Another implicitly associated device 110 may be a sensor 110 for physical location 112 known to the W4 COMN. The location 112 is known, either explicitly (through a user-designated relationship, e.g., this is my home, place of employment, parent, etc.) or implicitly (the user 102 is often co-located with the RWE 112 as evidenced by data from the sensor 110 at that location 112), to be associated with the first user 102.

The user 102 may also be directly associated with other people, such as the person 140 shown, and then indirectly associated with other people 142, 144 through their associations as shown. Again, such associations may be explicit (e.g., the user 102 may have identified the associated person 140 as his/her father, or may have identified the person 140 as a member of the user's social network) or implicit (e.g., they share the same address).

Tracking the associations between people (and other RWEs as well) allows the creation of the concept of "intimacy": Intimacy being a measure of the degree of association between two people or RWEs. For example, each degree of removal between RWEs may be considered a lower level of intimacy, and assigned lower intimacy score. Intimacy may be based solely on explicit social data or may be expanded to include all W4 data including spatial data and temporal data.

Each RWE 102, 104, 106, 108, 110, 112, 140, 142, 144 of the W4 COMN maybe associated with one or more IOs as shown. Continuing the examples discussed above, FIG. 1 illustrates two IOs 122, 124 as associated with the cell phone device 104. One IO 122 may be a passive data object such as an event record that is used by scheduling/calendaring software on the cell phone, a contact IO used by an address book application, a historical record of a transaction made using the device 104 or a copy of a message sent from the device 104. The other IO 124 may be an active software process or application that serves as the device's proxy to the W4 COMN by transmitting or receiving data via the W4 COMN. Voice communication software, scheduling/calendaring software, an address book application or a text messaging application are all examples of IOs that may communicate with other IOs and RWEs on the network. The IOs 122, 124 may be locally stored on the device 104 or stored remotely on some node or datastore accessible to the W4 COMN, such as a message server or cell phone service datacenter. The IO 126 associated with the vehicle 108 may be an electronic file containing the specifications and/or current status of the vehicle 108, such as make, model, identification number, current location, current speed, current condition, current owner, etc. The IO 128 associated with sensor 108 may identify the current state of the subject(s) monitored by the sensor 108, such as current weather or current traffic. The IO 130 associated with the cell phone 110 may be information in a database identifying recent calls or the amount of charges on the current bill.

Furthermore, those RWEs which can only interact with the W4 COMN through proxies, such as the people 102, 140, 142, 144, computing devices 104, 106 and location 112, may have one or more IOs 132, 134, 146, 148, 150 directly associated with them. An example includes IOs 132, 134 that contain contact and other RWE-specific information. For example, a person's IO 132, 146, 148, 150 may be a user profile containing email addresses, telephone numbers, physical addresses, user preferences, identification of devices and other RWEs associated with the user, records of the user's past interactions with other RWE's on the W4 COMN (e.g., transaction records, copies of messages, listings of time and location combinations recording the user's whereabouts in the past), the unique W4 COMN identifier for the location and/or any relationship information (e.g., explicit user-designations of the user's relationships with relatives, employers, co-workers, neighbors, service providers, etc.). Another example of a person's IO 132, 146, 148, 150 includes remote applications through which a person can communicate with the W4 COMN such as an account with a web-based email service such as Yahoo! Mail. The location's IO 134 may contain information such as the exact coordinates of the location, driving directions to the location, a classification of the location (residence, place of business, public, non-public, etc.), information about the services or products that can be obtained at the location, the unique W4 COMN identifier for the location, businesses located at the location, photographs of the location, etc.

In order to correlate RWEs and IOs to identify relationships, the W4 COMN makes extensive use of existing metadata and generates additional metadata where necessary. Metadata is loosely defined as data that describes data. For example, given an IO such as a music file, the core, primary or object data of the music file is the actual music data that is converted by a media player into audio that is heard by the listener. Metadata for the same music file may include data identifying the artist, song, etc., album art, and the format of the music data. This metadata may be stored as part of the music file or in one or more different IOs that are associated with the music file or both. In addition, W4 metadata for the same music file may include the owner of the music file and the rights the owner has in the music file. As another example, if the IO is a picture taken by an electronic camera, the picture may include in addition to the primary image data from which an image may be created on a display, metadata identifying when the picture was taken, where the camera was when the picture was taken, what camera took the picture, who, if anyone, is associated (e.g., designated as the camera's owner) with the camera, and who and what are the subjects of/in the picture. The W4 COMN uses all the available metadata in order to identify implicit and explicit associations between entities and data objects.

Figure 2:
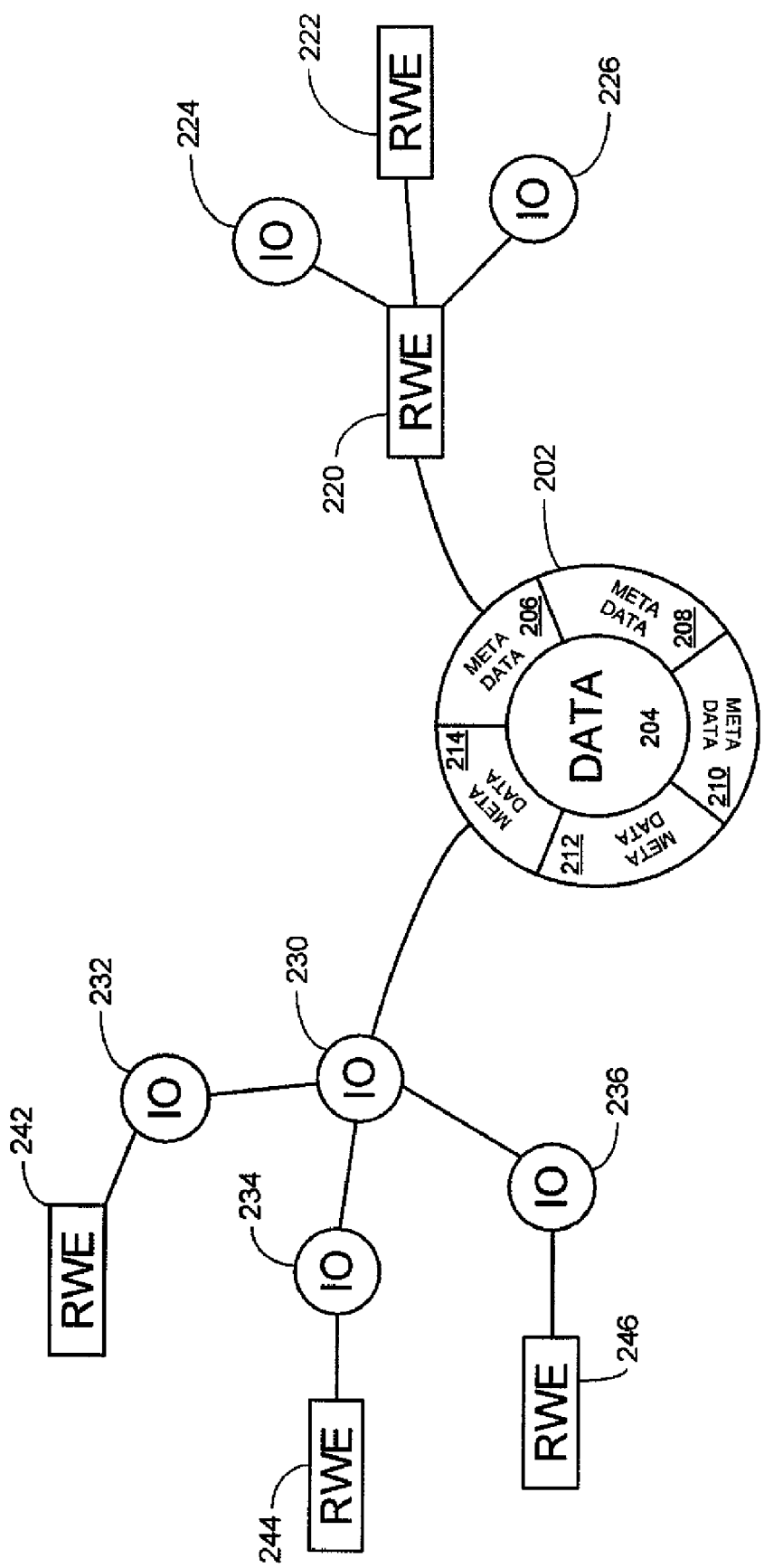
FIG. 2 illustrates an example of metadata defining the relationships between RWEs and IOs on the W4 COMN.

FIG. 2 illustrates an example of metadata defining the relationships between RWEs and IO s on the W4 COMN. In the embodiment shown, an IO 202 includes object data 204 and five discrete items of metadata 206, 208, 210, 212, 214. Some items of metadata 208, 210, 212 may contain information related only to the object data 204 and unrelated to any other IO or RWE. For example, a creation date, text or an image that is to be associated with the object data 204 of the IO 202.

Some of items of metadata 206, 214, on the other hand, may identify relationships between the IO 202 and other RWEs and IOs. As illustrated, the IO 202 is associated by one item of metadata 206 with an RWE 220 that RWE 220 is further associated with two IOs 224, 226 and a second RWE 222 based on some information known to the W4 COMN. This part of FIG. 2, for example, could describe the relations between a picture (IO 202) containing metadata 206 that identifies the electronic camera (the first RWE 220) and the user (the second RWE 224) that is known by the system to be the owner of the camera 220. Such ownership information may be determined, for example, from one or another of the IOs 224, 226 associated with the camera 220.

FIG. 2 also illustrates metadata 214 that associates the IO 202 with another IO 230. This IO 230 is itself associated with three other IOs 232, 234, 236 that are further associated with different RWEs 242, 244, 246. This part of FIG. 2, for example, could describe the relations between a music file (IO 202) containing metadata 206 that identifies the digital rights file (the first IO 230) that defines the scope of the rights of use associated with this music file 202. The other IOs 232, 234, 236 are other music files that are associated with the rights of use and which are currently associated with specific owners (RWEs 242, 244, 246).

Figure 3:
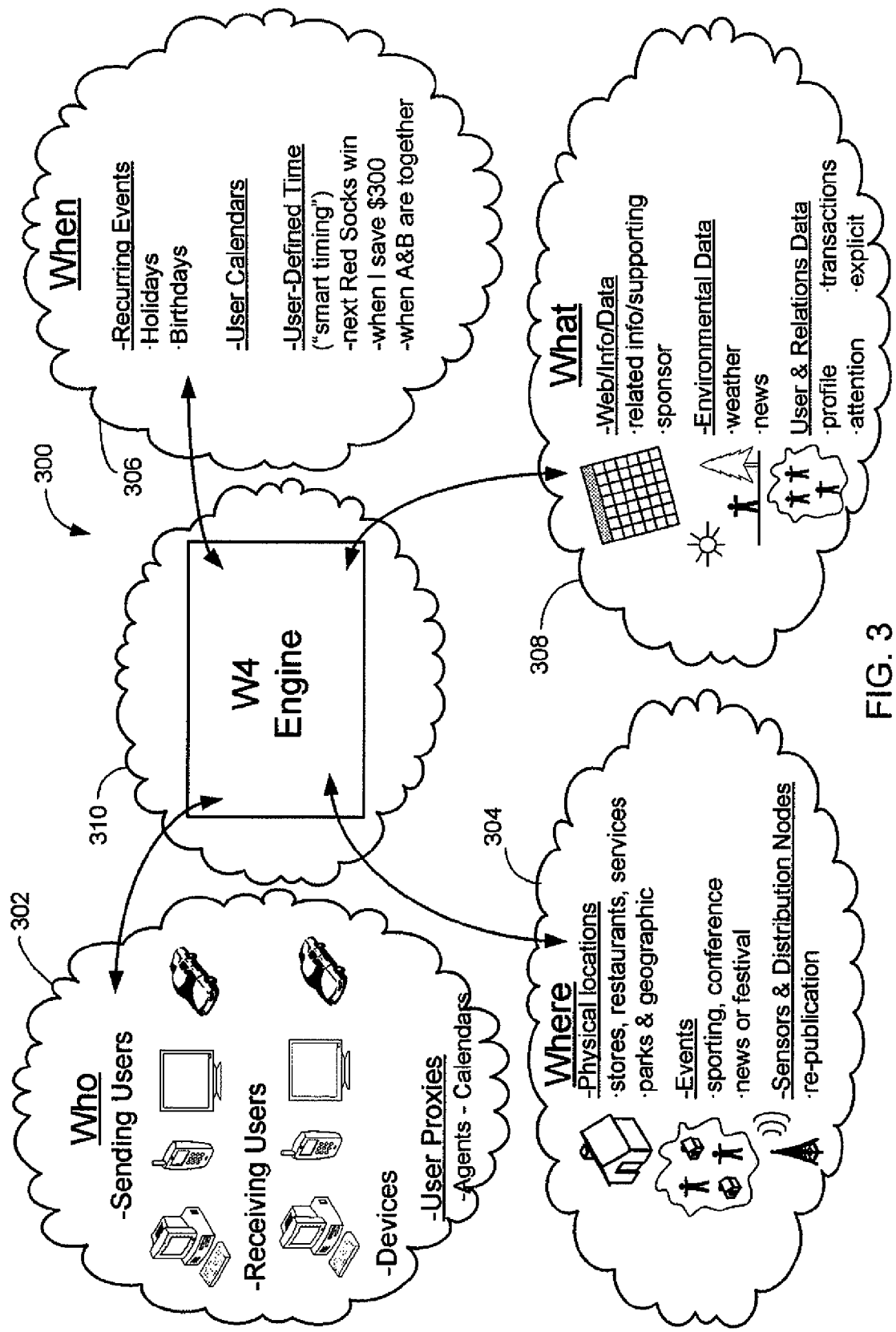
FIG. 3 illustrates a conceptual model of the W4 COMN.

FIG. 3 illustrates a conceptual model of the W4 COMN. The W4 COMN 300 creates an instrumented messaging infrastructure in the form of a global logical network cloud conceptually sub-divided into networked-clouds for each of the 4Ws: Who, Where, What and When. In the Who cloud 302 are all users whether acting as senders, receivers, data points or confirmation/certification sources as well as user proxies in the forms of user-program processes, devices, agents, calendars, etc. In the Where cloud 304 are all physical locations, events, sensors or other RWEs associated with a spatial reference point or location. The When cloud 306 is composed of natural temporal events (that is events that are not associated with particular location or person such as days, times, seasons) as well as collective user temporal events (holidays, anniversaries, elections, etc.) and user-defined temporal events (birthdays, smart-timing programs). The What cloud 308 is comprised of all known data—web or private, commercial or user—accessible to the W4 COMN, including for example environmental data like weather and news, RWE-generated data, IOs and IO data, user data, models, processes and applications. Thus, conceptually, most data is contained in the What cloud 308.

As this is just a conceptual model, it should be noted that some entities, sensors or data will naturally exist in multiple clouds either disparate in time or simultaneously. Additionally, some IOs and RWEs may be composites in that they combine elements from one or more clouds. Such composites may be classified or not as appropriate to facilitate the determination of associations between RWEs and IOs. For example, an event consisting of a location and time could be equally classified within the When cloud 306, the What cloud 308 and/or the Where cloud 304.

The W4 engine 310 is center of the W4 COMN's central intelligence for making all decisions in the W4 COMN. An "engine" as referred to herein is meant to describe a software, hardware or firmware (or combinations thereof) system, process or functionality that performs or facilitates the processes, features and/or functions described herein (with or without human interaction or augmentation). The W4 engine 310 controls all interactions between each layer of the W4 COMN and is responsible for executing any approved user or application objective enabled by W4 COMN operations or interoperating applications. In an embodiment, the W4 COMN is an open platform upon which anyone can write an application. To support this, it includes standard published APIs for requesting (among other things) synchronization, disambiguation, user or topic addressing, access rights, prioritization or other value-based ranking, smart scheduling, automation and topical, social, spatial or temporal alerts.

One function of the W4 COMN is to collect data concerning all communications and interactions conducted via the W4 COMN, which may include storing copies of IOs and information identifying all RWEs and other information related to the IOs (e.g., who, what, when, where information). Other data collected by the W4 COMN may include information about the status of any given RWE and IO at any given time, such as the location, operational state, monitored conditions (e.g., for an RWE that is a weather sensor, the current weather conditions being monitored or for an RWE that is a cell phone, its current location based on the cellular towers it is in contact with and current status.

The W4 engine 310 is also responsible for identifying RWEs and relationships between RWEs and IOs from the data and communication streams passing through the W4 COMN. The function of identifying RWEs associated with or implicated by IOs and actions performed by other RWEs is referred to as entity extraction. Entity extraction includes both simple actions, such as identifying the sender and receivers of a particular IO, and more complicated analyses of the data collected by and/or available to the W4 COMN, for example determining that a message listed the time and location of an upcoming event and associating that event with the sender and receiver(s) of the message based on the context of the message or determining that an RWE is stuck in a traffic jam based on a correlation of the RWE's location with the status of a co-located traffic monitor.

It should be noted that when performing entity extraction from an IO, the IO can be an opaque object with only W4 metadata related to the object (e.g., date of creation, owner, recipient, transmitting and receiving RWEs, type of IO, etc.), but no knowledge of the internals of the IO (i.e., the actual primary or object data contained within the object). Knowing the content of the IO does not prevent W4 data about the IO (or RWE) to be gathered. The content of the IO if known can also be used in entity extraction, if available, but regardless of the data available entity extraction is performed by the network based on the available data. Likewise, W4 data extracted around the object can be used to imply attributes about the object itself, while in other embodiments, full access to the IO is possible and RWEs can thus also be extracted by analyzing the content of the object, e.g. strings within an email are extracted and associated as RWEs for use in determining the relationships between the sender, user, topic or other RWE or IO impacted by the object or process.

In an embodiment, the W4 engine 310 represents a group of applications executing on one or more computing devices that are nodes of the W4 COMN. For the purposes of this disclosure, a computing device is a device that includes a processor and memory for storing data and executing software (e.g., applications) that perform the functions described. Computing devices may be provided with operating systems that allow the execution of software applications in order to manipulate data.

In the embodiment shown, the W4 engine 310 may be one or a group of distributed computing devices, such as general-purpose personal computers (PCs) or purpose built server computers, connected to the W4 COMN by suitable communication hardware and/or software. Such computing devices may be a single device or a group of devices acting together. Computing devices may be provided with any number of program modules and data files stored in a local or remote mass storage device and local memory (e.g., RAM) of the computing device. For example, as mentioned above, a computing device may include an operating system suitable for controlling the operation of a networked computer, such as the WINDOWS XP or WINDOWS SERVER operating systems from MICROSOFT CORPORATION.

Some RWEs may also be computing devices such as smart phones, web-enabled appliances, PCs, laptop computers, and personal data assistants (PDAs). Computing devices may be connected to one or more communications networks such as the Internet, a publicly switched telephone network, a cellular telephone network, a satellite communication network, a wired communication network such as a cable television or private area network. Computing devices may be connected any such network via a wired data connection or wireless connection such as a wi-fi, a WiMAX (802.36), a Bluetooth or a cellular telephone connection.

Local data structures, including discrete IOs, may be stored on a mass storage device (not shown) that is connected to, or part of, any of the computing devices described herein including the W4 engine 310. For example, in an embodiment, the data backbone of the W4 COMN, discussed below, includes multiple mass storage devices that maintain the IOs, metadata and data necessary to determine relationships between RWEs and IOs as described herein. A mass storage device includes some form of computer-readable media and provides non-volatile storage of data and software for retrieval and later use by one or more computing devices. Although the description of computer-readable media contained herein refers to a mass storage device, such as a hard disk or CD-ROM drive, it should be appreciated by those skilled in the art that computer-readable media can be any available media that can be accessed by a computing device.

By way of example, and not limitation, computer-readable media may comprise computer storage media and communication media. Computer storage media include volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassette, magnetic tape, magnetic disk storage or other magnetic storage devices, or any other medium which can be used to store the desired information and which can be accessed by the computer.

Figure 4:
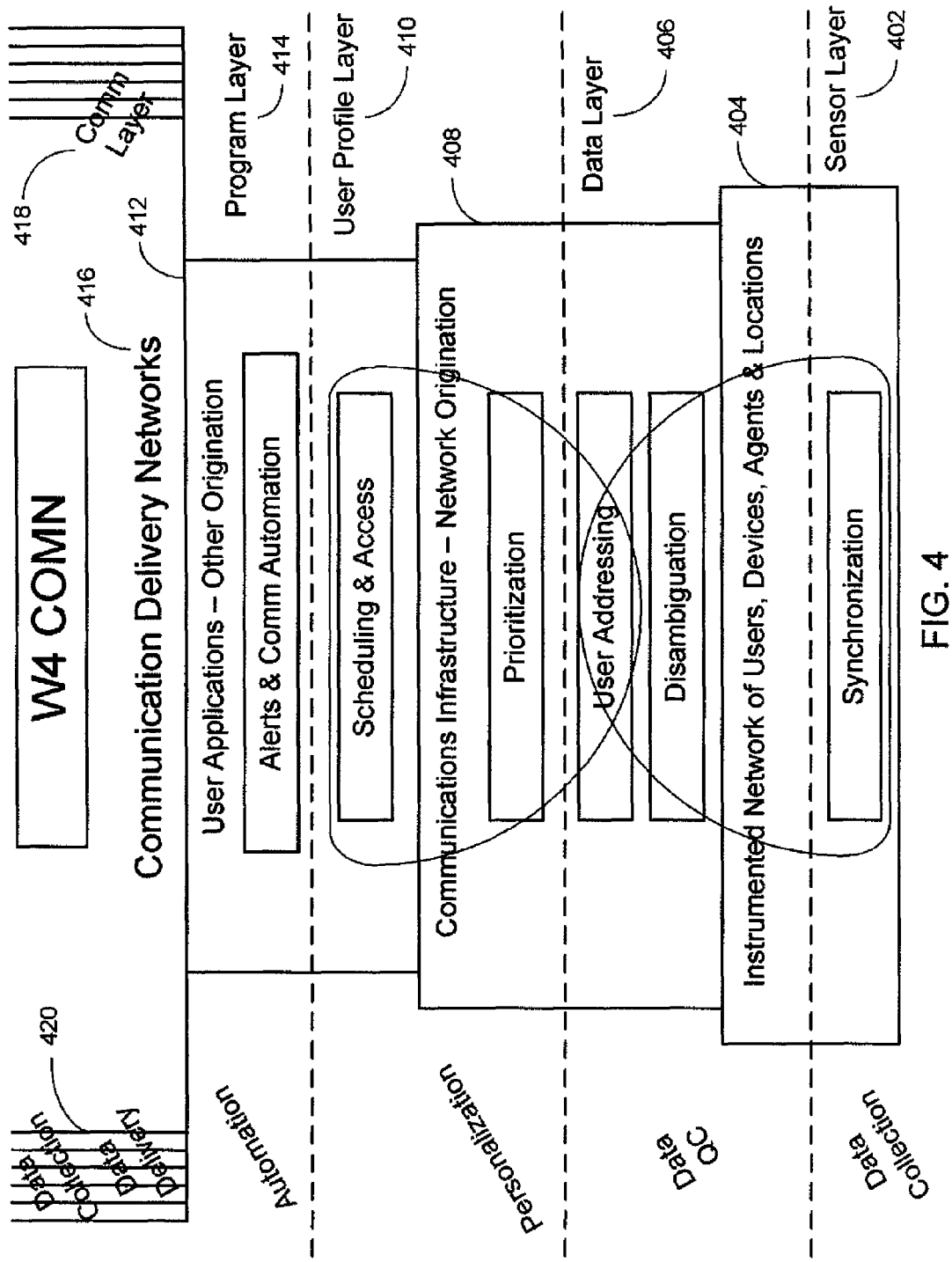
FIG. 4 illustrates the functional layers of the W4 COMN architecture.

FIG. 4 illustrates the functional layers of the W4 COMN architecture. At the lowest layer, referred to as the sensor layer 402, is the network 404 of the actual devices, users, nodes and other RWEs. The instrumentation of the network nodes to utilize them as sensors includes known technologies like web analytics, GPS, cell-tower pings, use logs, credit card transactions, online purchases, explicit user profiles and implicit user profiling achieved through behavioral targeting, search analysis and other analytic models used to optimize specific network applications or functions.

The next layer is the data layer 406 in which the data produced by the sensor layer 402 is stored and cataloged. The data may be managed by either the network 404 of sensors or the network infrastructure 406 that is built on top of the instrumented network of users, devices, agents, locations, processes and sensors. The network infrastructure 408 is the core under-the-covers network infrastructure that includes the hardware and software necessary to receive and transmit data from the sensors, devices, etc. of the network 404. It further includes the processing and storage capability necessary to meaningfully categorize and track the data created by the network 404.

The next layer of the W4 COMN is the user profiling layer 410. This layer 410 may further be distributed between the network infrastructure 408 and user applications/processes 412 executing on the W4 engine or disparate user computing devices. In the user profiling layer 410 that functions as W4 COMN's user profiling layer 410. Personalization is enabled across any single or combination of communication channels and modes including email, IM, texting (SMS, etc.), photobloging, audio (e.g. telephone call), video (teleconferencing, live broadcast), games, data confidence processes, security, certification or any other W4 COMN process call for available data.

In one embodiment, the user profiling layer 410 is a logic-based layer above all sensors to which sensor data are sent in the rawest form to be mapped and placed into the W4 COMN data backbone 420. The data (collected and refined, related and deduplicated, synchronized and disambiguated) are then stored in one or a collection of related databases available to all processes of all applications approved on the W4 COMN. All network-originating actions and communications are based upon the fields of the data backbone, and some of these actions are such that they themselves become records somewhere in the backbone, e.g. invoicing, while others, e.g. fraud detection, synchronization, disambiguation, can be done without an impact to profiles and models within the backbone.

Actions originating from anything other than the network, e.g., RWEs such as users, locations, proxies and processes, come from the program layer 414 of the W4 COMN. Some applications may be developed by the W4 COMN operator and appear to be implemented as part of the communications infrastructure 408, e.g. email or calendar programs because of how closely they operate with the sensor processing and user profiling layer 410. The applications 412 also serve some role as a sensor in that they, through their actions, generate data back to the data layer 406 via the data backbone concerning any data created or available due to the applications execution.

The applications layer 414 also provides a personalized user interface (UI) based upon device, network, carrier as well as user-selected or security-based customizations. Any UI can operate within the W4 COMN if it is instrumented to provide data on user interactions or actions back to the network. This is a basic sensor function of any W4 COMN application/UI, and although the W4 COMN can interoperate with applications/UIs that are not instrumented, it is only in a delivery capacity and those applications/UIs would not be able to provide any data (let alone the rich data otherwise available from W4-enabled devices.)

In the case of W4 COMN mobile devices, the UI can also be used to confirm or disambiguate incomplete W4 data in real-time, as well as correlation, triangulation and synchronization sensors for other nearby enabled or non-enabled devices. At some point, the network effects of enough enabled devices allow the network to gather complete or nearly complete data (sufficient for profiling and tracking) of a non-enabled device because of it's regular intersection and sensing by enabled devices in it's real-world location.

Above the program layer 414 (and sometimes hosted within it) is the communications delivery network(s) 416. This can be operated by the W4 COMN operator or be an independent third-party carrier service, but in either case it functions to deliver the data via synchronous or asynchronous communication. In every case, the communication delivery network 414 will be sending or receiving data (e.g., http or IP packets) on behalf of a specific application or network infrastructure 408 request.

The communication delivery layer 418 also has elements that act as sensors including W4 entity extraction from telephone calls, emails, blogs, etc. as well as specific user commands within the delivery network context, e.g., "save and prioritize this call" said before end of call may trigger a recording of the previous conversation to be saved and for the W4 entities within the conversation to be analyzed and increased in weighting prioritization decisions in the personalization/user profiling layer 410.

Figure 5:
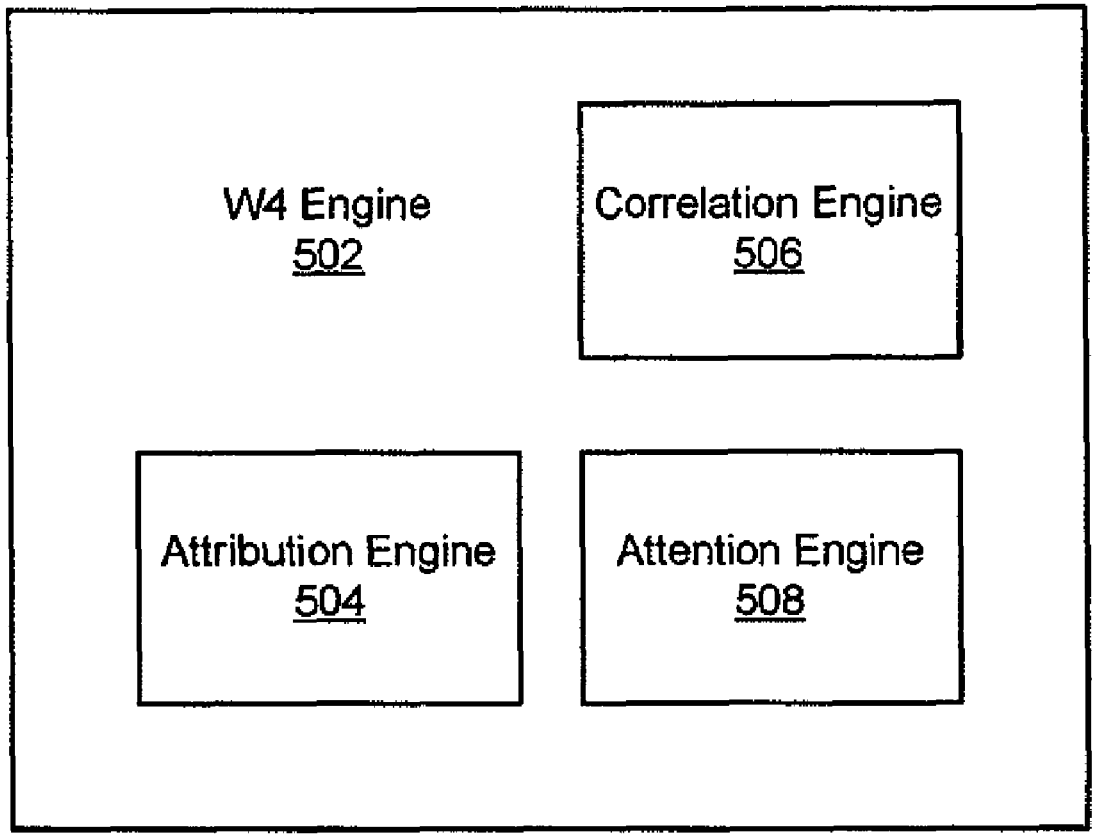
FIG. 5 illustrates an embodiment of analysis components of a W4 engine as shown in FIG. 2.

FIG. 5 illustrates an embodiment of analysis components of a W4 engine as shown in FIG. 3. As discussed above, the W4 Engine is responsible for identifying RWEs and relationships between RWEs and IOs from the data and communication streams passing through the W4 COMN.

In one embodiment the W4 engine connects, interoperates and instruments all network participants through a series of sub-engines that perform different operations in the entity extraction process. One such sub-engine is an attribution engine 504. The attribution engine 504 tracks the real-world ownership, control, publishing or other conditional rights of any RWE in any IO. Whenever a new IO is detected by the W4 engine 502, e.g., through creation or transmission of a new message, a new transaction record, a new image file, etc., ownership is assigned to the IO. The attribution engine 504 creates this ownership information and further allows this information to be determined for each IO known to the W4 COMN.

The W4 engine 502 further includes a correlation engine 506. The correlation engine 506 operates in two capacities: first, to identify associated RWEs and IOs and their relationships (such as by creating a combined graph of any combination of RWEs and IOs and their attributes, relationships and reputations within contexts or situations) and second, as a sensor analytics pre-processor for attention events from any internal or external source.

In one embodiment, the identification of associated RWEs and IOs function of the correlation engine 506 is done by graphing the available data. In this embodiment, a histogram of all RWEs and IOs is created, from which correlations based on the graph may be made. Graphing, or the act of creating a histogram, is a computer science method of identify a distribution of data in order to identify relevant information and make correlations between the data. In a more general mathematical sense, a histogram is simply a mapping $m_i$ that counts the number of observations that fall into various disjoint categories (known as bins), whereas the graph of a histogram is merely one way to represent a histogram. By selecting each IO, RWE, and other known parameters (e.g., times, dates, locations, etc.) as different bins and mapping the available data, relationships between RWEs, IOs and the other parameters can be identified.

As a pre-processor, the correlation engine 506 monitors the information provided by RWEs in order to determine if any conditions are identified that may trigger an action on the part of the W4 engine 502. For example, if a delivery condition has been associated with a message, when the correlation engine 506 determines that the condition is met, it can transmit the appropriate trigger information to the W4 engine 502 that triggers delivery of the message, The attention engine 508 instruments all appropriate network nodes, clouds, users, applications or any combination thereof and includes close interaction with both the correlation engine 506 and the attribution engine 504.

Figure 6:
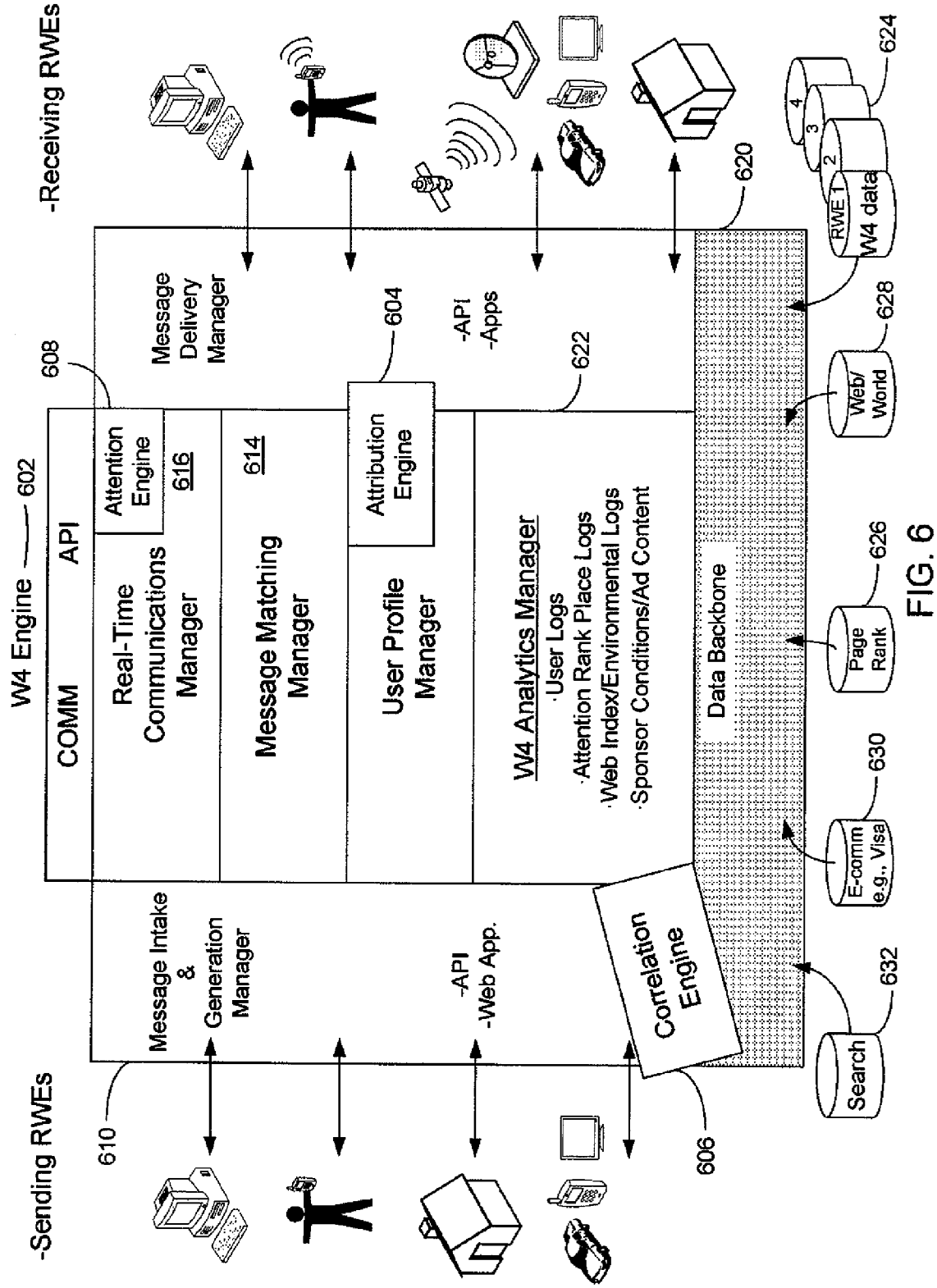
FIG. 6 illustrates an embodiment of a W4 engine showing different components within the sub-engines described generally above with reference to FIG. 5.

FIG. 6 illustrates an embodiment of a W4 engine showing different components within the sub-engines described generally above with reference to FIG. 4. In one embodiment the W4 engine 600 includes an attention engine 608, attribution engine 604 and correlation engine 606 with several sub-modules/managers based upon basic function.

The attention engine 608 includes a message intake and generation manager 610 as well as a message delivery manager 612 that work closely with both a message matching manager 614 and a real-time communications manager 616 to deliver and instrument all communications across the W4 COMN.

The attribution engine 604 works within the user profile manager 618 and in conjunction with all other modules to identify, process/verify and represent ownership and rights information related to RWEs, IOs and combinations thereof.

The correlation engine 606 dumps data from both of its channels (sensors and processes) into the same data backbone 620 which is organized and controlled by the W4 analytics manager 622 and includes both aggregated and individualized archived versions of data from all network operations including user logs 624, attention rank place logs 626, web indices and environmental logs 618, e-commerce and financial transaction information 630, search indexes and logs 632, sponsor content or conditionals, ad copy and any and all other data used in any W4 COMN process, IO or event. Because of the amount of data that the W4 COMN will potentially store, the data backbone 620 includes numerous database servers and datastores in communication with the W4 COMN to provide sufficient storage capacity.

As discussed above, the data collected by the W4 COMN includes spatial data, temporal data, RWE interaction data, IO content data (e.g., media data), and user data including explicitly-provided and deduced social and relationship data. Spatial data may be any data identifying a location associated with an RWE. For example, the spatial data may include any passively collected location data, such as cell tower data, global packet radio service (GPRS) data, global positioning service (GPS) data, WI-FI data, personal area network data, IP address data and data from other network access points, or actively collected location data, such as location data entered by the user.

Temporal data is time based data (e.g., time stamps) that relates to specific times and/or events associated with a user and/or the electronic device. For example, the temporal data may be passively collected time data (e.g., time data from a clock resident on the electronic device, or time data from a network clock), or the temporal data may be actively collected time data, such as time data entered by the user of the electronic device (e.g., a user maintained calendar).

The interaction data may be any data associated with user interaction of the electronic device, whether active or passive. Examples of interaction data include interpersonal communication data, media data, relationship data, transactional data and device interaction data, all of which are described in further detail below. Table 1, below, is a non-exhaustive list including examples of electronic data.

TABLE 1

Examples of Electronic Data

| Spatial Data | Temporal Data | Interaction Data |
| --- | --- | --- |
| Cell tower data | Time stamps | Interpersonal |
| GPRS data | Local clock | communication data |
| GPS data | Network clock | Media data |
| WiFi data | User input of | Relationship data |
| Personal area network data | time data | Transactional data |
| Network access points data | | Device interaction data |
| User input of location data | | |
| Geo-coordinates data | | |

With respect to the interaction data, communications between any RWEs may generate communication data that is transferred via the W4 COMN. For example, the communication data may be any data associated with an incoming or outgoing short message service (SMS) message, email message, voice call (e.g., a cell phone call, a voice over IP call), or other type of interpersonal communication relative to an RWE, such as information regarding who is sending and receiving the communication(s). As described above, communication data may be correlated with, for example, temporal data to deduce information regarding frequency of communications, including concentrated communication patterns, which may indicate user activity information.

Logical and IO data refers to the data contained by an IO as well as data associated with the IO such as creation time, owner, associated RWEs, when the IO was last accessed, etc. If the IO is a media object, the term media data may be used. Media data may include any data relating to presentable media, such as audio data, visual data, and audiovisual data. For example, the audio data may be data relating to downloaded music, such as genre, artist, album and the like, and includes data regarding ringtones, ringbacks, media purchased, playlists, and media shared, to name a few. The visual data may be data relating to images and/or text received by the electronic device (e.g., via the Internet or other network). The visual data may be data relating to images and/or text sent from and/or captured at the electronic device. The audiovisual data may be data associated with any videos captured at, downloaded to, or otherwise associated with the electronic device. The media data includes media presented to the user via a network, such as use of the Internet, and includes data relating to text entered and/or received by the user using the network (e.g., search terms), and interaction with the network media, such as click data (e.g., advertisement banner clicks, bookmarks, click patterns and the like). Thus, the media data may include data relating to the user's RSS feeds, subscriptions, group memberships, game services, alerts, and the like. The media data also includes non-network activity, such as image capture and/or video capture using an electronic device, such as a mobile phone. The image data may include metadata added by the user, or other data associated with the image, such as, with respect to photos, location when the photos were taken, direction of the shot, content of the shot and time of day, to name a few. As described in further detail below, media data may be used, for example, to deduce activities information or preferences information, such as cultural and/or buying preferences information.

The relationship data may include data relating to the relationships of an RWE or IO to another RWE or IO. For example, the relationship data may include user identity data, such as gender, age, race, name, social security number, photographs and other information associated with the user's identity. User identity information may also include e-mail addresses, login names and passwords. Relationship data may further include data identifying explicitly associated RWEs. For example, relationship data for a cell phone may indicate the user that owns the cell phone and the company that provides the service to the phone. As another example, relationship data for a smart car may identify the owner, a credit card associated with the owner for payment of electronic tolls, those users permitted to drive the car and the service station for the car.

Relationship data may also include social network data. Social network data includes data relating to any relationship that is explicitly defined by a user or other RWE, such as data relating to a user's friends, family, co-workers, business relations, and the like. Social network data may include, for example, data corresponding with a user-maintained electronic address book. Relationship data may be correlated with, for example, location data to deduce social network information, such as primary relationships (e.g., user-spouse, user-children and user-parent relationships) or other relationships (e.g., user-friends, user-co-worker, user-business associate relationships). Relationship data also may be utilized to deduce, for example, activities information.

The interaction data may also include transactional data. The transactional data may be any data associated with commercial transactions undertaken by or at the mobile electronic device, such as vendor information, financial institution information (e.g., bank information), financial account information (e.g., credit card information), merchandise information and costs/prices information, and purchase frequency information, to name a few. The transactional data may be utilized, for example, to deduce activities and preferences information. The transactional information may also be used to deduce types of devices and/or services the user owns and/or in which the user may have an interest.

The interaction data may also include device or other RWE interaction data. Such data includes both data generated by interactions between a user and a RWE on the W4 COMN and interactions between the RWE and the W4 COMN. RWE interaction data may be any data relating to an RWE's interaction with the electronic device not included in any of the above categories, such as habitual patterns associated with use of an electronic device data of other modules/applications, such as data regarding which applications are used on an electronic device and how often and when those applications are used. As described in further detail below, device interaction data may be correlated with other data to deduce information regarding user activities and patterns associated therewith. Table 2, below, is a non-exhaustive list including examples of interaction data.

TABLE 2

Examples of Interaction Data

| Type of Data | Example(s) |
| --- | --- |
| Interpersonal communication data | Text-based communications, such as SMS and e-mail |
| | Audio-based communications, such as voice calls, voice notes, voice mail |
| | Media-based communications, such as multimedia messaging service (MMS) communications |
| | Unique identifiers associated with a communication, such as phone numbers, e-mail addresses, and network addresses |
| Media data | Audio data, such as music data (artist, genre, track, album, etc.) |
| | Visual data, such as any text, images and video data, including Internet data, picture data, podcast data and playlist data |
| | Network interaction data, such as click patterns and channel viewing patterns |
| Relationship data | User identifying information, such as name, age, gender, race, and social security number |
| | Social network data |
| Transactional data | Vendors |
| | Financial accounts, such as credit cards and banks data |
| | Type of merchandise/services purchased |
| | Cost of purchases |
| | Inventory of purchases |
| Device interaction data | Any data not captured above dealing with user interaction of the device, such as patterns of use of the device, applications utilized, and so forth |

Ranking Attention Using W4 Data

One notable aspect of the W4 COMN is the ability to use W4 data to rank any identifiable IO and RWE based on the actual attention they receive from users as determined by the W4 data. The attention rank engine (described below) combines web data with entity attention data to create a combined and complete unique ID model and ranking ability for places, events, objects and people that incorporates both web data as well as actual user-generated data in real time and space. The resulting combined ranking can be used in the aggregate or personalized along any W4 vector (including sponsor campaigns).

The attention rank systems and methods described herein are particularly useful in countering problems created by using standard web page ranking techniques as a means for ranking web pages and their subject matter/content. Web page ranking techniques are well known in the art and often rely on such vectors as number of user visits or clicks on a web page, number of links to the web page, etc. Such web-based techniques are applicable only to subject matter and content that is somehow represented online. Another drawback of such ranking techniques is that they can be skewed, manipulated or subverted, both accidentally and on purpose, e.g., by those attempting to inflate the rank of a particular web page in a search query. Furthermore, web-based techniques inherently rank web pages based only on one perspective: that of online community and users' online actions.

The W4 engine is adapted to analyze the W4 data in order to rank different RWEs known to the W4 COMN. In an embodiment, the modules and components that work together primarily to rank RWEs based on user attention are referred to collectively as the attention rank engine. The attention rank engine (ARE) uses physical world attention as a declaration of interest, analogous to the declaration of interest represented by a search term resulting in sponsored search ads, to create a new actionable network for capturing and modeling human and online attention into a singular rank for purposes of matching to entities, users or queries.

In the world every RWE can be considered to have a natural rank based upon popularity and the nature and quality of the attention given by users to the person, place, thing, event, etc. In every city, there is a number one pizza restaurant, a number seven dry cleaners and a number 22 oil change place, and yet this data is neither captured nor modeled effectively to be includable with web data about the same real-world stores online. For example, the pizza shop may have a website, and it may be reviewed well by users on that site or other city guide sites, but it's ranking in search results through search engines does not take into account that it has the most traffic, the most revenue and/or the most repeat customers of any pizza place in the city.

Combining the actual data that is picked up through the W4 COMN, a model of information objects is created that maps web objects/web pages to RWEs to combine data from both worlds (i.e., the online world and the real world) in order to increase the efficiency, accuracy and dynamic evolution of matching users to other RWEs including other users, businesses, things events, etc.

Everything in the world can be assigned an attention rank by combining and weighting the online data about that RWE with all known data obtained from offline sources about the same RWE. Attention is recorded in the real world by devices, activities, communications, transactions and sensors while attention is recorded online by browsers and devices and carriers and Network operators, activities, communications, transactions and instrumented pages or networks.

The ARE interacts with the web-world and the clouds 302, 304, 306, 308 of the real world shown in FIG. 3 as sources for data about users, objects and their attributes/relations in each respective sphere of existence. By modeling both the real world and the online world, the ARE combines data from multiple possible sources, weighting them based upon behavior in real-time to produce a combined ranking for total User attention both online and offline. This ranking can be aggregated for all users or personalized in order to provide an individual attention rank for each known user in every context with every RWE.

Figure 7:
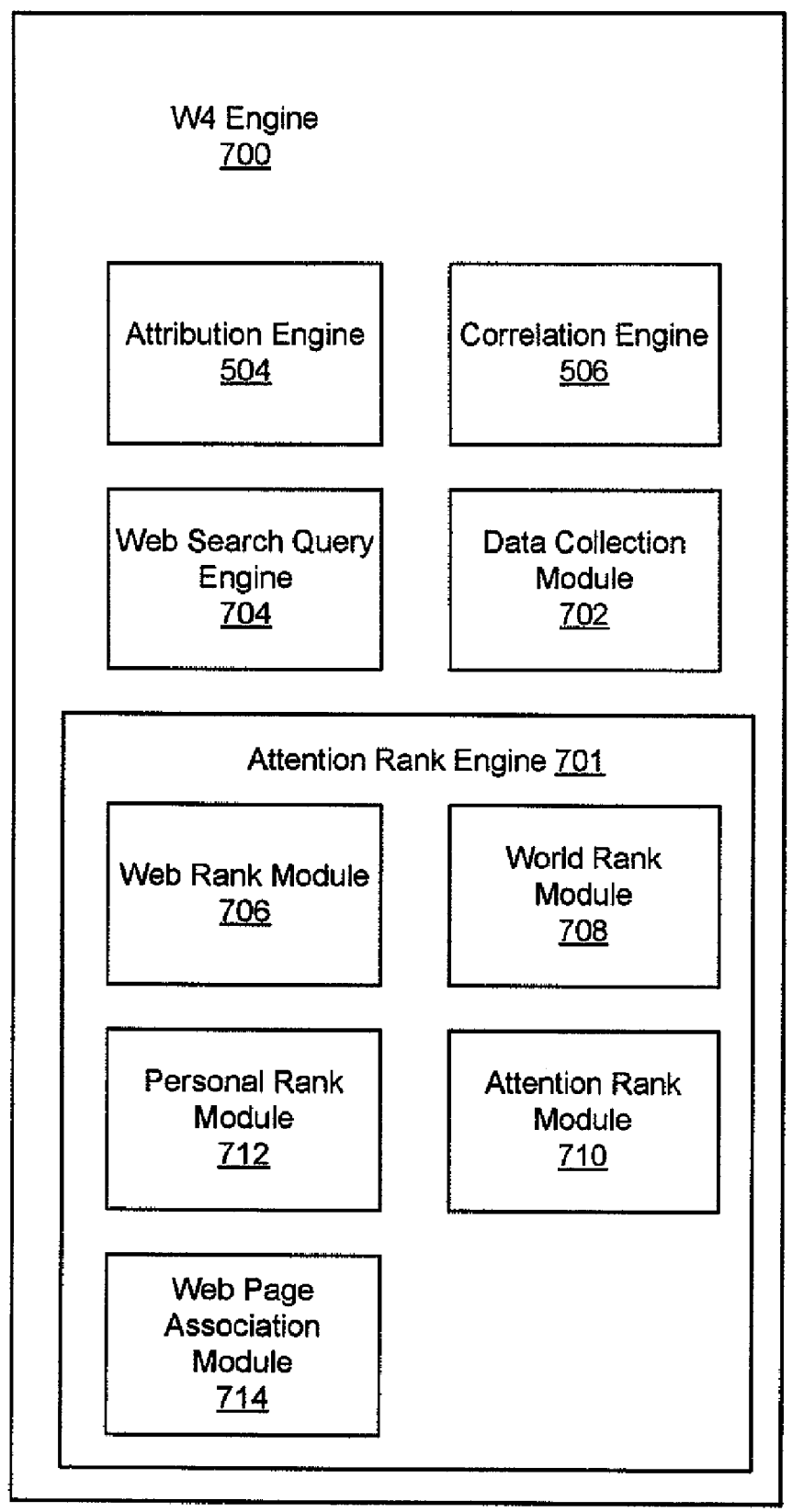
FIG. 7 illustrates elements of an embodiment of a W4 engine adapted to rank attention using W4 data as described herein.

FIG. 7 illustrates elements of an embodiment of a W4 engine adapted to rank attention using W4 data as described herein. The W4 engine 700 includes a correlation engine 506 and an attribution engine 504 as described above with reference to FIG. 5. The W4 engine 700 is further provided with a data collection module 702 that collects W4 data from communications on the various communication channels interoperating with the W4 COMN. The data collection module 702 collects and stores user data from communications transmitted by the RWEs. Such data may include the number of communications, the communication channel, and the subject of the communication. In addition, as described elsewhere, the data may be analyzed to determine additional information and identify any RWEs and/or IOs related to a particular communication.

When collecting and analyzing W4 data, as discussed above, it should be understood that multiple RWEs and IOs may be associated with a single communication as a sender, recipient and/or subject or other related party. For example, a user may create and send an email message using a laptop computer. The user is an RWE having a unique W4 identifier. In addition, the laptop is an RWE with its own unique W4 identifier. The email application on the laptop may be tracked as an IO with its own unique W4 identifier. Furthermore, the laptop computer may be wirelessly connected to a communication network by a wireless router, which is an RWE with a unique W4 identifier, at a known location (yet another RWE with a unique identifier), corresponding to one or more businesses (each being another RWE with unique identifiers). In addition, the email may be sent at a specific time during which other cellphones (each being another RWE with its own unique W4 identifier) were recorded as being at the same location. In an embodiment, some or all of the user, laptop computer and email application may be considered a sender of the IO that is the email message. In this case, the user may be considered the originating sender and the laptop and email application proxies for the originating sender.

The concept of proxies was discussed above and is particularly important here where it is anticipated that human actors, either as senders, recipients, purchasers, attendees or entities related to a communication, will be known to the W4 COMN primarily through information obtained from their proxies (e.g., proxy RWEs, such as their smart phones, computing devices, sensors, smart vehicles, home phones, physical credit cards, etc., and proxy IOs such as email accounts, communication software, credit card accounts, data objects containing data generated by a RWE, data objects containing data about an RWE or event, etc.).

In an embodiment, this determination of the users related to a communication, including determining who the user, if any, is that should be considered the original sender, purchaser, recipient, passerby, or attendee may be performed by the W4 engine 700. For example, the attribution engine 504, as described above, may identify the ultimate human sender and recipient of communications. It should also be noted that some messages maybe sent by a process programmatically, e.g., automatically during the course of the execution of a program, so that there is not a human sender to be identified but rather only a sender IO. Alternatively, the attribution engine 504 may only identify the sending proxy RWE that actually places the message into the W4 COMN and any other associated RWEs (e.g., other proxies and/or originating sender) may be identified by the correlation engine 506. In this alternative, the correlation engine 506 may analyze some or all the W4 collected by the data collection module 702 in order to identify all RWEs that are associated with each communication and what the nature of the association, underlying action or relationship is based on the communication. For example, a communication indicating that a purchase was made with physical credit card at a business may be used to identify a relationship between the purchaser (i.e., the person for which the physical credit card is a proxy) and the business (i.e., the RWE associated with the account credited with the transaction).

The W4 engine 700, upon receipt of a communication, records all the relevant communication data and may further analyze the data to generate additional information for later use as described below. This may include requesting that the correlation engine 506 correlate the channel-specific identifiers of the senders, recipients, etc. with other W4 data in order to identify all RWEs, particularly human users, if any, related to the communication.

It should be understood that any human or non-networked entity that is a sender, recipient, subject or related party of a communication may be identified only by proxy RWEs or IOs. For example, an email may be sent by or directed to "john.smith@yahoo.com" or a telephone call may be directed to "(720)555-0505." In both cases, the identifiers (i.e., "john.smith-@yahoo.com" and "(720)555-0505") used to identify the human are identifiers of proxies of the actual intended human recipient. Based on the W4 data known to the W4 COMN, these identifiers of proxies may be analyzed, e.g., by the correlation engine 506, in order to determine the unique W4 identifier of the RWE that is accessed by, represented by or working through the proxy RWE or proxy IO. For example, "john.smith@yahoo.com" and "(720)555-0505" may be communication channel-specific identifiers of RWEs that the W4 COMN is aware are proxies for a known human RWE (e.g., a user already known to the W4 COMN) with a distinct unique W4 identifier.

The embodiment of the W4 engine 700 shown further includes an embodiment of an ARE 701 illustrating some of the components that may be incorporated within the ARE 701. In the embodiment shown the ARE 701 includes a set of modules that work together and perform different functions to rank the attention given different RWEs using W4 data. The ARE 701 produces attention ranks and personal ranks for different RWEs which can then be used for any purpose such as re-ranking of search results and selection of content/sponsored ads. Indeed, by providing a measure of actual user interest based on real-time data describing user's actual and online activities, the output of the ARE 701 can be used to improve the accuracy of any system, prediction or process which is related to user interests.

In the embodiment shown, the ARE 701 has four primary modules for integrating all known data: a world rank module 708, a web rank module 706, an attention rank module 710 and a personal rank module 712. In an alternative embodiment, the functions of the ARE 701 may be combined or divided into more or fewer modules and additional functionality may be included.

The world rank module 708 interoperates with one or more networks to gather data about users in the real world and model that data in such a way as to be ingested and combined with data from the web rank module 706 to form a combined graph of the global rank inside the attention rank module 710 which may be filtered down to an individuated form by the personal rank module 712 for the augmentation of search results or selection of content/sponsored content for presentation to a user.

The world rank module 708 accesses and analyzes the data collected from the real world by the data collection module 702. The world rank module 708 then uses the data to model real-world users' attention through devices, physical presence, transaction records and participation histories as well as any communications that may occur or be modeled by data produced by a user in the real-world.

In an embodiment, the output of the world rank module 708 is an entity rank for each RWE known to the system. The entity rank may be a relative rank or may be a absolute rank, depending on how operators of the system choose to implement the world rank module 708. Such an entity rank may be determined based on a analysis of all the data available at the time that entity rank is needed so that the rank reflects the most recent actions of RWEs as well as the past actions.

Combining the attention of users to, from or about something from place clouds, event clouds, thing/object clouds, node clouds, people clouds and any other real-world data producing network, the world rank module 708 models attention by any number of vectors including where, when, who, what (including objects, activities and everything else). The modeling is supported by the W4 COMN's system of assigning each RWE a unique W4 identifier which allows the RWEs which associated with each communication known to the W4 COMN to be identified and the activities and user attention which those communications represent positively characterized.

In an embodiment, the web rank module 706 captures and stores all the data produced through a user's interaction with the Internet. In an alternative embodiment, a web logging engine, which may be considered part of the data collection module 702, collects data generated through online activities and this web data is simply accessed as needed by the web rank module 706. Such web data may include the addresses, rank(s), score(s), click-through rates, transaction history, server logs, topic, tags, ownership or rights, links or other associations, etc. and associates that data with the same unique W4 identifier used by the world rank module 708 for entities known to be the same. By probabilistically mapping web objects to real world items a system like UPC codes for products or social security numbers for humans is created, and a model is created to move the web data "from strings to objects."

In an embodiment the output of the web rank module 706 may include a web rank for web pages known to the system. For example, each web page, domain name, web object or grouping of web objects (hereinafter collectively referred to only as "web pages") may be considered an individual IO and provided its own unique W4 identifier. The web rank module 706 may then assign each web page a web rank based on an analysis of the web data.

In an embodiment, the attention rank module 710 uses the entity ranks and web ranks to generate a combined attention rank for each RWE and web page known to the system. In an alternative embodiment, the attention rank module 710 may take the data and models from both the world rank module 708 and the web rank module 706 to create a combined model for every object in both the real world and the web world. From the combined model, the attention rank module 710 then generates an attention rank for the RWEs and web pages. In most instances, an entity may only truly exist in one or the other while being represented in the other by one or more proxies. In those instances in which an entity truly does not have a presence or proxy in one or the other world, such an entity may still be assigned both a web and real world rank in which one is just the null set.

In the embodiment shown, a web page association module 714 is provided for determining what RWEs, if any, are associated with each particular web page. The web page association module 714 may search the content and other metadata associated with a web page to identify information that allows the web page to be correlated to one or more RWEs and from that correlation, the unique W4 identifier of the RWEs associated with a web page may be determined. For example, a home page for a pizza restaurant may include information in the text of the web page that allows the web page to be associated with the unique W4 identifier for the restaurant. With this identification, it is possible for the attention rank module 710 to combine the web rank and information (derived from such data as number of hits, unique user page views, click-throughs, etc.) associated with the restaurant's home page and the entity rank and information (derived from such data as credit card purchases, hours spent by users at the restaurant, number of calls to the restaurants delivery order telephone number, etc.) for the actual restaurant. In an embodiment, some web pages may include metadata that identifies the RWEs to be associated with the web page for attention rank purposes. Alternatively, the web page association module 714 may identify the associated RWEs by an analysis of the content of the web page, such as keyword and address mapping.

The attention rank module 710 can evenly combine the web and real world data for a combined ranking, or it may weight one world higher than the other, or it may even apply a differentiated ranking to both web and real-world events to create a unique set of ranking factors to produce a final ranking for an item in a specific context, e.g. in response to a query, user request or user comparison.

The attention rank module 710 may also act like a traffic aggregation center for real-time attention on both the web and in the real world, and as such, may be able to provide an aggregated picture of current attention by all users or any logically definable subset of users or attention (e.g., user demographic). This data can be shared with other components in the W4 COMN or third party applications for many services, including displaying attention via mapping.

The personal rank module 712 can be considered a filter that identifies a personal attention rank (hereinafter a "personal rank") which is relative to a specific user and takes into account the relative importance of that user's known relationships with other RWEs and IOs. Thus, if a user's circle of friends are determined to be giving significant attention to a particular musician, coffee shop or movie, the personal rank for these RWEs would reflect that information. The personal rank module 712 applies some dimension of filters to the global attention rank model to form a personal attention rank graph which is then used as the filter for any/all attention ranking activities. The personalization filter's attributes can be programmed automatically by the W4 COMN based on known relationships and/or by the user directly, or may even be open-sourced for third party development. Such filters may be static (only changed through explicit instructions) or dynamic (automatically update themselves based upon use, user status, etc.).

The ARE 701 can be completely behind-the-scenes, interoperating with existing applications and systems for search and other services, or it could also provide it's own specialized self-serve applications for attention rank operations. For example, in the embodiment shown the W4 engine 700 includes a web search query engine 704. The web search query engine 704 interacts with users searching the web by receiving search queries, such as in the form of a string of keywords, and searching web pages or an index of web pages for those pages that match the search query, which may include retrieving information from the web rank module 706. Upon determining the results of the web search, the web search query engine may retrieve the attention rank for each web page in the web page query result and present the web page query result based on the attention rank of the web pages in the results set.

As the reader can see, in this embodiment the web search query engine 704 may work closely with all the various modules of the ARE 701 as opposed to ranking web search results based only on web data and web rank information. Furthermore, the query results may be further tailored to personal tastes by using the personal rank as well as the web rank and entity rank.

An attention rank system can include one or more ARE 701 specialized for specific areas, users or topics, or those specializations can be contained within a singular ARE in the form of varying attention rank models. These models provide the instructions for processing real world data into an attention data model.

In one embodiment, an attention model data structure may include at least the fields for "From," "To," and "About" for every instance of attention being modeled. In another embodiment, another field representing the type and role of attention being modeled are also included.

In an embodiment, the personal rank module 712 uses the ARE's 701 attention models as the base for creating a user's individual filters, i.e. a personal attention model that includes any personal preferences for both collecting attention data about a user but also which types of attention data the user would like to be included within his/her own attention personalization filters.

Thus, each ARE 701 may use a specific attention model to define the context for processing any request, and the context creates the taxonomy and weighting conditions for attention types. For example, in certain contexts, one type of attention may be valued over another, e.g. user's looking at a painting vs. user's taking a digital photo of it.

By modeling the types and forms of attention, the resistance and affordance of both the entity rank and the web rank can be combined including the W4 data of attention that creates a unique graph to graph n-dimensional topology. In one embodiment, this topology representation may be used as a unique identifier for that object or attention vector.

So likewise the personal rank module 712 can use this data to calculate an attention distance between any user and any context to better augment results, content or services to the User in their specific context. Such an attention distance between users may be considered a measure of similarity of interests between users. Between a user and another RWE, the attention distance may be considered a measure of the relative importance of that RWE to the user. In some instances the actual topology of specific types of attention can be forecast to correlate with certain types of events, e.g. natural disasters, for use as a risk management tool.

Figure 8:
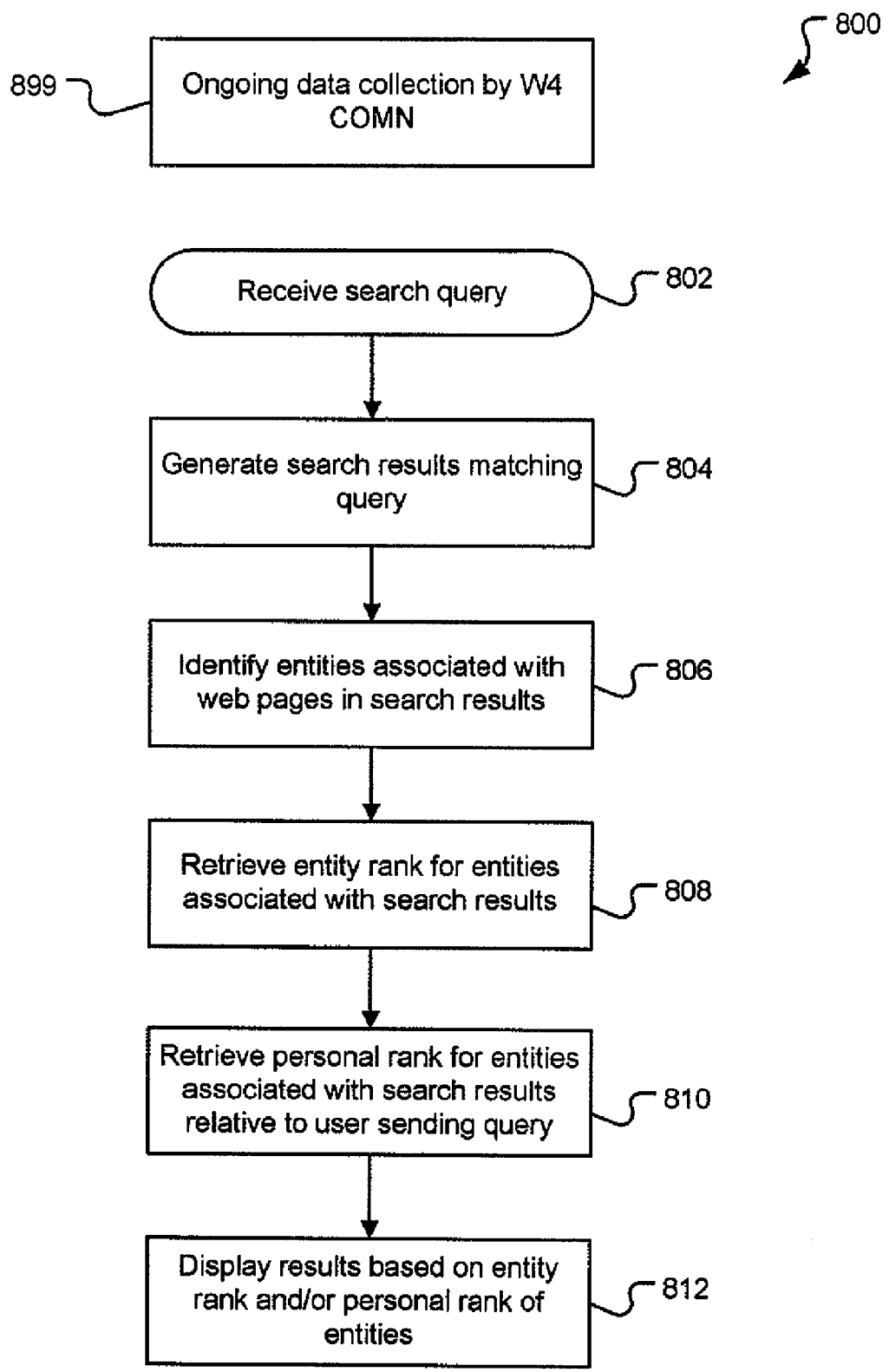
FIG. 8 illustrates an embodiment of a method for delivering messages over a network based on social, temporal, spatial and topical data for entities on the network.

FIG. 8 illustrates an embodiment of a method for ranking attention based on social, temporal, spatial and topical data for entities on a network. The method is described in the context of a web page query in which the attention rank information is used to modify the results of a web page query. This is but one use attention rank information and the user will understand that such information may be adapted for any use in which decisions or actions may be taken based on differences in user actions and attention relative to RWEs. For example, attention rank information may be used to select content (online or offline) to be displayed to a user, advertisements to be displayed to a user, automatic reallocation of resources based on evidence of changing user demand as determined by relative increase or decrease in attention rank, identifying user interests, comparison of user demographics, and identification of valuable real and intangible property to name only a few.

In the embodiment described below, depending on how the architecture is implemented, the operations described may be performed by one or more of the various components, engines and modules described above. In addition, sub-engines may be created and used to perform specific operations in order to improve the network's performance as necessary.

As described above, a foundational aspect of the W4 COMN that allows for conditional message delivery is the ongoing collection and maintenance of W4 data from the RWEs interacting with the network. In an embodiment, this collection and maintenance is an independent operation 899 of the W4 COMN and thus current W4 social, temporal, spatial and topical data are always available for use in testing of delivery conditions. In addition, part of this data collection operation 899 includes the determination of ownership and the association of different RWEs with different IOs as described above including prioritization among specific groups or sub-groups of RWEs and IOs. Therefore, each IO disowned/controlled by at least one RWE with a known, unique identifier on the W4 COMN, and each IO may have many associations with other RWEs that are known to the W4 COMN.

In the embodiment shown, the method 800 is initiated when a search query is received in a receive query operation 802. Such a search query may be a request from a user for a listing of web pages matching a provided set of keywords or search terms. In an alternative embodiment, the search query may be a request for a listing of companies, service providers, or other entities that match certain criteria, e.g., "closest five star pizza", "best biking trails in Denver", "best bands playing tonight", and "best elk hunting in Colorado". In this case, such a request is not looking for web pages that most closely match the search criteria but rather for physical entities that match the search criteria.

Query requests may be generated by software on a computing device operated by a user or by an automated process. As discussed above, one or more RWEs (e.g., an RWE in the form of a device that is a known proxy for a another RWE such as a user) may be identified as a sender of the request. Such identifications may be made from the data of the request, the source of the request or a combination of both. In addition, deductions may be made concerning a user that is the sender of the request based on W4 data for the known device or software senders of the message, as previously described.

The method 800 shown then generates a set of search results for the query in a generate search result operation 804. The generate search results operation 804 includes searching the appropriate index or database of information, determining which items (e.g., web pages) match the search query based on a predetermined algorithm or matching program and generating a set of results for the search. The results may be a listing of web pages or a listing of RWEs depending on the query. In a web page search embodiment, the generation of a results set may include searching an index for web pages matching the query and further generating a web rank for each web page based how well the web page content matches the search query in addition to other factors that may impact the web rank of a web page as discussed above, e.g., popularity of the web page, number of hits, etc.

The generate search result operation 804 operation may include generating a web rank based on the query as is known in the art. Such web ranks have been described in greater detail above and any suitable method for generating a web rank for a web page based on information known about the web page and its similarity to the terms and conditions of a search query may be used.

In the web page search embodiment shown in FIG. 8, after generating the search results, the individual web pages in the set of results are analyzed to determine which RWE or RWEs are associated with each web page in an identify associated RWE operation 806. As discussed above, such association may have been previously determined, for example, when each web page was indexed and the relevant information for use in later search query matching was stored. For example, at the time a web page is indexed, its content may be analyzed and one or more RWEs may be selected as the RWEs to be associated with the web page; then the unique identifier(s) for the selected RWE(s) may be stored along with the web page's information in the index. Alternatively, the content of the web pages may be searched at the time the search query is received and the associated RWEs identified from the information contained in the index. In an embodiment, information indicating the type of association (e.g., the RWE is the subject of the web page, listed in the web page, etc.) may be determined as part of the identification operation 806.

The identification operation 806 may compare the contents of a web page to previously created RWE definitions developed from RWE communications with the W4 COMN. Based on the similarity between the contents of the web page and the RWE definition, a determination may be made that a specific entity (e.g., person, place, thing, location, event, etc.) discussed in the web page corresponds to a known RWE on the W4 COMN with a unique W4 identifier. This allows the identification operation 806 to not only identify entities discussed in web pages or other content, but also to determine the unique W4 identifier of the RWE that represents that entity on the W4 COMN, thereby allowing additional information about the entity derived from other sources to be found.

When the RWEs associated with the various web pages in the search results are known, an entity rank for each RWE may be retrieved using each RWEs unique identifier in a retrieve entity rank operation 808. Depending on the embodiment, the entity rank for each RWE may be determined prior to receiving the search request (e.g., the entity rank is periodically or occasionally generated based on the W4 data available at that time) or may be generated dynamically in response to a request by the attention rank engine for an entity rank. As discussed above, the entity rank is derived from W4 data which, in an embodiment, is obtained from sources other than web page content. It should be understood that in some circumstances W4 data may end up as content on web pages, but in the embodiment that data may or may not be retrieved from the web pages, but rather retrieved from the communications on the W4 COMN.

The entity rank for each RWE is used to modify how the search results are displayed in a display results operation 812. The display results operation 812 may include displaying the search results based on the web rank of the web pages in the search results and based on the entity rank for each RWE associated with each of the web pages. In an embodiment, a combined rank for each web page in the results set may be generated that takes into account both the web rank and the entity rank of any associated entity. For example, the two ranks may simply be added or multiplied together to determine a combined rank. In alternative embodiments, the combination may include preferentially weighting one or the other of the ranks. Such weighting may further be dynamically selected based on a type of search. For example, a query that appears to be focused on identifying a business may weight the entity rank higher, while a query that appears to be requesting information about RWEs for comparison purposes may weight web rank higher.

The display operation 812 may alter the order in which web pages are presented in the search results based on the web and entity ranks. Thus, this allows web pages whose subjects are highly popular RWEs but which, nonetheless, have low web ranks to appear higher earlier in the list of results. Alternatively, the display operation 812 may display information about the RWE associated with each web page, including, for example, the name and the entity rank of the RWE. Additional links may also be provided. For example, if the searching user can be identified from the query, a link to reviews of the RWE by people in the searcher's social network or by reviewers known to be consulted by the searcher in the past may be provided.

The embodiment shown in FIG. 8 further includes an optional retrieve personal rank operation 810 in which a personal rank for the RWEs associated with the various web pages in the search results is generated and retrieved. As discussed above, the personal rank is a ranking of RWEs from the perspective of and relative to the searching user. For example, such a personal rank may including taking into account information about a user's geographic location. For example, while Chicago-style pizza may be very important to a given user, because that user is currently in San Diego, Calif., the personal rank of pizza restaurants in San Diego may be higher than a pizza restaurant in Chicago. Similar to the entity rank, the personal rank may have been generated prior to the search query and merely retrieved when needed or may be generated dynamically on an as needed basis, which has the benefit of using the most up-to-date information.

If the personal rank is also retrieved, the display operation 812 uses this information and modifies the display of the search results accordingly. In an embodiment, a combined rank based on the web rank, entity rank and personal rank may be created. As discussed above, each different rank may be weighted differently in order to skew the combined rank.

Because personal rank and entity rank are a ranking of entities and not web pages, the ARE may continuously update the ranks as new information about users actions is received from communications on the W4 COMN. Thus, as a given user's tastes change (as reflected by changes in the user's actions), the personal rank of various RWEs will change also. Likewise, as additional information related to RWEs are collected over time, changes in user actions indicating a change popularity, use or importance of an RWE relative to other RWEs of the same type and relative to all RWEs known to the system can be detected and automatically reflected in the entity rank. Thus, when a musical act becomes popular quickly, the entity and personal ranks will reflect such changes in real time.

Figure 9:
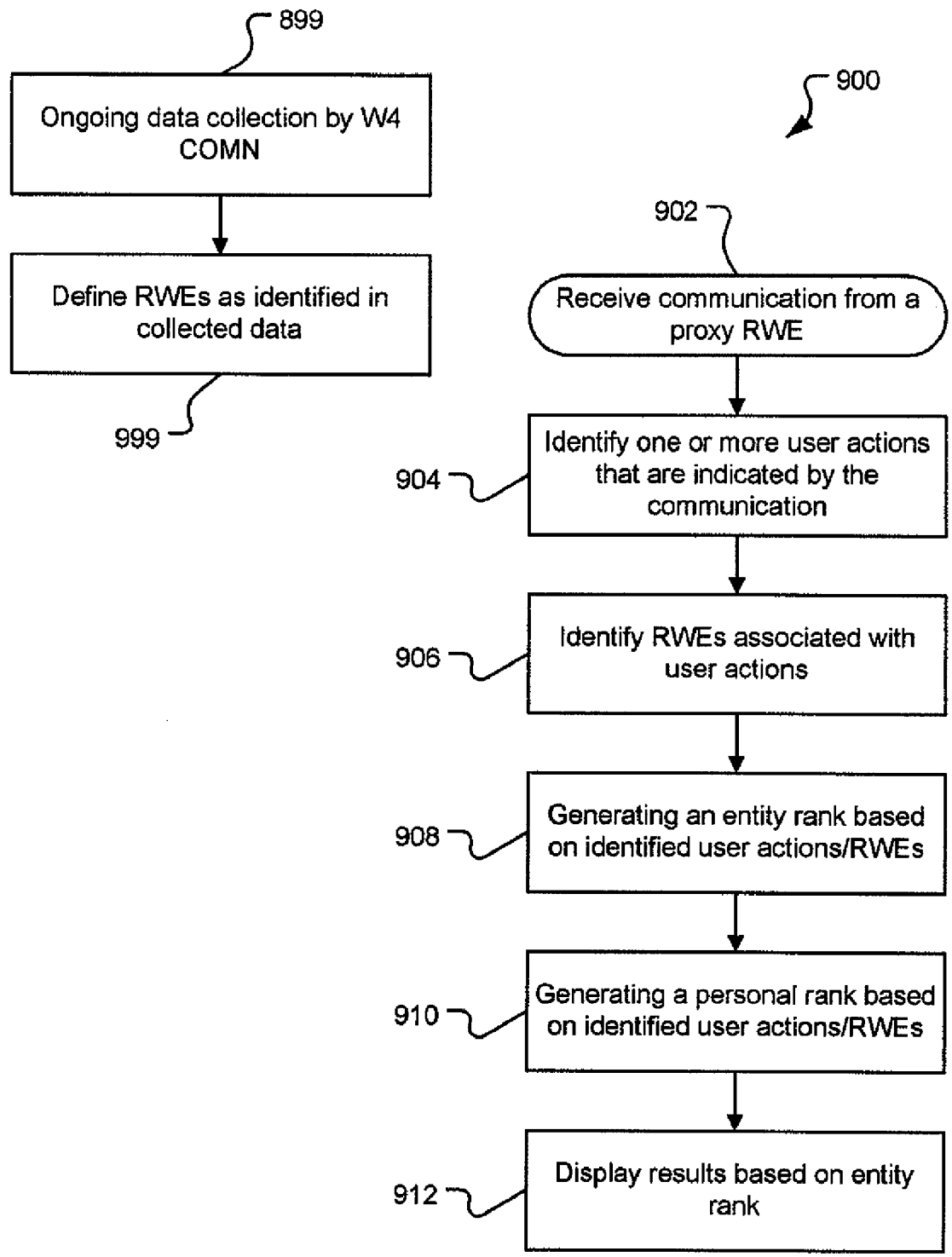
FIG. 9 illustrates an embodiment of a method for generating an entity rank for RWEs on a network based on user actions as determined from W4 data received from different communication channels.

FIG. 9 illustrates an embodiment of a method 900 for generating an entity rank for RWEs on a network based on user actions as determined communications received from different communication channels. In the embodiment shown, data is collected as previously described with reference to FIG. 8 in an ongoing data collection operation.

As discussed above, the data may be collected from communications detected by the W4 COMN. In the embodiment, a communication (e.g., an electronic message or transmission between RWEs such as a message sent between by a first user via the first user's proxy device to a second user via the second user's proxy) may be considered to be detected when it is received from the sender(s). It is anticipated that under most circumstances that any attributable sender RWE (including any user and certainly any proxy device) will already be known to the W4 COMN and provided with a unique W4 identifier as well as at least one communication channel-specific address (which is another form of unique identifier). In cases of truly new RWEs, such as new telephone numbers, new devices that have never before been detected/used on the W4 COMN, a new RWE definition is created for that RUE and a new unique W4 identifier assigned to that RWE. The W4 COMN further will continually evaluate the W4 data looking for evidence of relationships so that, over time, new RWEs may be positively identified as proxies or otherwise associated with other RWEs.

The analysis of communications, identification of new RWEs by the W4 COMN and subsequent creation of new RWE definitions as a result of the identification is illustrated in the Method 900 by the entity definition operation 999. This operation 999 includes the initial assignment of a unique W4 identifier to the RWE as well as the ongoing task of identifying relationships between the RWE and other RWEs over time. For example, upon first use of a cell phone it may not be possible to determine who the cell phone is a proxy for. In such as situation, a new RWE may be defined for the cell phone (e.g., based on its telephone number or device identifier) and a new placeholder RWE may be defined for the as-yet-unknown user for whom the cell phone is a proxy. Subsequently, over time it may be possible to collect information from a plurality of different sources, surveillance video, cell phone location information, RFID transponder data, and credit card transactions to identify that the cell phone is a proxy device of a previously known user. In this case the placeholder RWE may be deleted and the cell phone associated with the previously known user.

Such ongoing revision of RWE definitions, then, can be considered to include creating an RWE definition for each newly identified RWE including for each new device that interacts directly with the W4 COMN by transmitting a communication over the network and for each perceived, known or inferred person, place, legal entity, event or definable real-world thing that is not directly capable of transmitting communications via the network. For any entity not directly capable of transmitting communications, the definition operation 999 includes identifying those entities' proxies on the network, for example what traffic sensor is a proxy for which section of highway, what cell phone is a proxy for which user, what home telephone is a proxy for which users and which location, and what credit card is a proxy for which user.

The definition operation 999 may generate an identifiable definition for each RWE or may simply create a set of data associations that collectively serve as the RWE definition. Any suitable way of collecting information and identifying it as the an RWE definition may be used as long as the system can positively identify the RWE. In an embodiment, an RWE definition may include one or more parameters such as spatial coordinates or other location identifiers, temporal parameters such as defined one or more specified time periods, social parameters such a identified social relationships with other RWEs (e.g., friends, co-workers, team mates, neighbors, familial relationships, etc.), keywords such as identified activities that are of interest, and electronic entity identifiers. A definition may also include an identification of all proxies currently known for the RWE.

The method 900 describes additional operations involved in identifying the actions of users and, from that information, generating entity ranks for RWEs. After the initial RWEs have been defined and are known, subsequent communications can be analyzed to identify user actions that indicated by the communications. In the embodiment of the method shown, the analysis begins when a communication is received in a receive communication operation 902. Such a communication may be generated by software on a computing device operated by a user, by an automated process or by a "dumb" device such as a cellular phone or a sensor. As discussed above, one or more RWEs may be identified as a sender of the message. Such identifications may be made from the data of the message, the source of the request or a combination of both. In addition, deductions may be made concerning a user that is the sender of the message based on W4 data for the known device or software senders of the message, as previously described.

A communication will further identify one or more recipients of the message. As discussed above, each recipient may be identified by a channel-specific identifier of a proxy RWE of the recipient. Thus, similar to the situation with senders, there may be multiple recipients associated with a message. For example, a recipient of an email may be identified as "bill.smith@yahoo.com", which is an email address for a electronic mail account. Using the W4 data, it may be determined that the user associated that email address has multiple proxies on the W4 COMN including for example the email account identified by "bill.smith@yahoo.com", a mobile telephone identified with a telephone number, a home telephone identified by a different telephone number, a toll payment transponder identified by a transponder identification number, a car identified by a license plate, an internet protocol (IP) address, a business telephone identified by a third telephone number, and a home address identified by one or more physical location coordinates or addresses. In an embodiment, requests to deliver a message to a recipient that is determined to be a proxy for a user (or other RWE such as a business or location) may be interpreted as requests to deliver the message to the user (or other RWE) that is accessible via the proxy as discussed below.

RWEs and IOs associated with a communication may be identified in the content or transmission information by any identifier, unique or non-unique, communication channel-specific or global, as long as the identifier can be resolved by the W4 COMN to a known RWE or IO, that is to a unique W4 identifier. Resolving channel-specific identifiers can be done by correlating the channel-specific identifier with other W4 data. Non-unique identifiers (e.g., email address identifiers such as "Mom", "father", "Debby", "Bob", "Starbucks") may have to be disambiguated based on the W4 data known about the sender and the message to be delivered and any suitable disambiguation method may be utilized for this purpose.

In an embodiment, a communication may be considered to be detected when it is received from the sender(s), although the reader will understand that the message may not have actually been sent at the time of receipt or detection by the W4 COMN. It is anticipated that under most circumstances that any attributable sender will already be known to the W4 COMN and provided with a unique W4 identifier as well as at least one communication channel-specific address (which is another form of unique identifier).

As mentioned above, the data collection may include receiving an actual IO (e.g., message file, audio data or snippet of text) from an RWE or from an IO such as an email application being executed by an RWE. The IO that is the communication may contain data such as the text or contents of the communication as well as additional information in the form of metadata. The data contained may be evaluated in order to identify the sender(s), recipient(s), additional RWEs associated with the message (e.g., people listed in text of a message but that are neither the sender nor a recipient), other IOs (e.g., hyperlinks to IOs, attachments, etc.) contained in the message, delivery conditions if any and any topics discussed in the message.

The receive communication operation 902 may be considered to occur at any point in the delivery chain within the W4 COMN, e.g., by any one of the engines used to conduct IO intake, routing or delivery. For example, depending on how the implementers of the W4 COMN choose to implement the network functions, a message may be received and initially analyzed and information routed to the correlation engine and addressing engine by any one of the message intake and generation manager, user profile manager, message delivery manager or any other engine or manager in the W4 COMN's communication delivery chain.

After receipt of the communication, the contents of the communication are analyzed and user action are identified in an action identification operation 904. The analysis performed in the action identification operation 904 may include searching the communications for data matching one or more predefined action types such as a purchase, a co-location for a significant period of time, co-location due to passing through to another destination, participation in an event, etc. Such action identification may be performed by searching the communication to identify keywords or data strings that are associated with different action definitions.

For example, data strings in a credit card transaction may be used to identify that a user made a purchase as well as to identify what was purchased, what RWE the purchase was made from, and how much was paid. All this data may be stored so that the credit card, the credit card's owner, the item purchased, the business from which the purchase was made and the location of the business are associated at the time of the purchase.

Events, that is a specified time period and location (that may, or may not, be associated with other RWEs as well, e.g., sports teams, plays, meetings, etc.), may also be tracked for attention purposes. In such cases, user actions that implicate attendance or other actions associated with an event (e.g., buying a ticket) may be identified. The event, if it is a defined IO or RWE known by the system, may then be associated with the user and the entity and personal ranks for the event modified to reflect this information/association.

The action identification operation 904 is optional and, in an alternative embodiment, such information may be derived from comparing RWE information between RWEs.

The method 900 also includes an RWE identification operation 906 in which RWEs associated with the communication are identified. The RWE identification operation 906 may include searching the communication for data matching one or more RWE definitions.

The RWE identification operation 906 includes determining whether the RWEs identified are proxies for other RWEs. In addition, if a specified RWE is not a proxy, the identification operation 906 further includes identifying any RWEs that may be used as proxies for the specified RWE.

For example, given the relationships described in FIG. 1, a sender of an IO may specify an email address for the user 102 as a recipient. By retrieving the W4 data for the email address, it can be determined that it is a proxy for the user 102 and that the user 102 has many other proxies that could be used to identify the location of the user 102 including the car 106 and cell phone 104. The identification operation 906 may further identify the IOs (e.g., IOs 122, 124, 126) from which the current location information may be obtained for each of the identified proxies for the current location of the user 102.

The identification of proxies, as discussed above, may be explicit (e.g., designated as proxies by their associated user or RWE) or implicitly determined based on an analysis of W4 data. As discussed above, such W4 data may have been collected from messages, communications and IOs previously obtained or handled by the W4 COMN via many different communication channels and systems, including email and text-based communication channels as well as any communication channels that include audio data including channels that support telephone, voice over internet protocol (VOIP), and video communications such as video chat.

To determine implicit proxies, the W4 data may be graphed in order to determine what RWEs are related and how and from this information make probabilistic assumptions about the nature of the relationships between RWEs. In an embodiment, correlations are made for and between each of the RWEs known to the W4 COMN based on the social data, spatial data, temporal data and logical data associated with each RWE. In one sense, the graphing operation may be considered a form of comparing the retrieved social data, spatial data, temporal data and logical data for all RWEs to identify relationships between RWEs and other contextual similarities.

It should be noted that the determination of implicit proxies may be performed each time a delivery condition is tested. This allows for the dynamic determination of the appropriate proxy for any RWE at any time. For example, during the week a corporate car or corporate cell phone may be considered a good proxy for the location of a recipient; but during the weekend a personal cell phone or personal car may be considered a better proxy for the recipient than the work cell phone.

After the user action(s) and RWEs have been identified as described above, an entity rank is generated for each RWE in an entity rank generation operation 908. In the entity rank generation operation 908, an entity rank is generated for each RWE based on the current W4 data. The generation operation 908 will revise any previously generated entity ranks based on the newly received information.

Generating an entity rank may involve simple or complex algorithms. For example, in an embodiment a simple summation of the number of communications received, by any communication channel, that reference a particular RWE may be used as the entity rank for that RWE. This embodiment will cause the entity rank to reflect users whose proxies are co-located with the RWE, users that made purchases at the RWE, and even users that discussed the RWE in communications with other users.

The correlation and comparison process of the entity rank generation operation 908 can determine relationships between parties, topics, locations, etc. in part though the W4 COMN's identification of each RWE by a unique identifier and storage of information about the past interactions by those RWEs. The actual values or other metrics obtained as entity ranks by the generation operation 908 may vary depending on the calculations performed and weighting factors used. Any suitable method or algorithm for generating a value from different relationships identified in the data may be used. For example, all ranks may be normalized to some scale or may be aggregated without normalization.

In an embodiment, the W4 data are processed and analyzed using data models that treat data not as abstract signals stored in databases, but rather as IOs that represent RWEs that actually exist, have existed, or will exist in real space, real time, and are real people, objects, places, times, and/or events. As such, the data model for W4 IOs that represent W4 RWEs (Where/When/Who/What) will model not only the signals recorded from the RWEs or about the RWEs, but also represent these RWEs and their interactions in ways that model the affordances and constraints of entities and activities in the physical world. A notable aspect is the modeling of data about RWEs as embodied and situated in real world contexts so that the computation of similarity, clustering, distance, and inference take into account the states and actions of RWEs in the real world and the contexts and patterns of these states and actions.

For example, for temporal data the computation of temporal distance and similarity in a W4 data model cannot merely treat time as a linear function. The temporal distance and similarity between two times is dependent not only on the absolute linear temporal delta between them (e.g., the number of hours between "Tuesday, November 20, 4:00 pm Pacific Time" and "Tuesday, November 20, 7:00 pm Pacific Time"), but even more so is dependent on the context and activities that condition the significance of these times in the physical world and the other W4 RWEs people, places, objects, and events) etc.) associated with them. For example, in terms of distance and similarity, "Tuesday, November 20, 4:00 pm Pacific Time" and "Tuesday, November 27, 4:00 pm Pacific Time" may be modeled as closer together in a W4 temporal data model than "Tuesday, November 20, 4:00 pm Pacific Time" and "Tuesday, November 20, 7:00 pm Pacific Time" because of the weekly meeting that happens every Tuesday at work at 4:00 pm vs. the dinner at home with family that happens at 7 pm on Tuesdays. Contextual and periodic patterns in time may be important to the modeling of temporal data in a W4 data model.

Another temporal data modeling issue is to model the various periodic patterns of daily life such as day and night (and subperiods within them such as morning, noon, afternoon, evening, etc.) and the distinction between the workweek and the weekend. In addition, salient periods such as seasons of the year and salient events such as holidays also affect the modeling of temporal data to determine similarity and distance. Furthermore, the modeling of temporal data for IOs that represent RWEs should correlate temporal, spatial, and weather data to account for the physical condition of times at different points on the planet. Different latitudes have different amounts of daylight and even are opposite between the northern and southern hemispheres. Similar contextual and structural data modeling issues arise in modeling data from and about the RWEs for people, groups of people, objects, places, and events.

With appropriate data models for IOs that represent data from or about RWEs, a variety of machine learning techniques can be applied to analyze the W4 data. In an embodiment, W4 data may modeled as a "feature vector" in which the vector includes not only raw sensed data from or about W4 RWEs, but also higher order features that account for the contextual and periodic patterns of the states and action of W4 RWEs. Each of these features in the feature vector may have a numeric or symbolic value that can be compared for similarity to other numeric or symbolic values in a feature space. Each feature may also be modeled with an additional value from 0 to 1 (a certainty value) to represent the probability that the feature is true. By modeling W4 data about RWEs in ways that account for the affordances and constraints of their context and patterns in the physical world in features and higher order features with or without certainty values, this data (whether represented in feature vectors or by other data modeling techniques) can then be processed to determine similarity, difference, clustering, hierarchical and graph relationships, as well as inferential relationships among the features and feature vectors.

A wide variety of statistical and machine learning techniques can be applied to W4 data from simple histograms to Sparse Factor Analysis (SFA), Hidden Markov Models (HMMs), Support Vector Machines (SVMs), Bayesian Methods, etc. Such learning algorithms may be populated with data models that contain features and higher order features represent not just the "content" of the signals stored as IOs, e.g., the raw W4 data, but also model the contexts and patterns of the RWEs that exist, have existed, or will exist in the physical world from which these data have been captured.

Calculations or algorithms used in the entity rank generation operation 908 may be further modified by limiting the communications used to generate the entity rank to those communications received within a predefined window of time (e.g., within the last six months for example). Additional distinctions may be made based on the type of RWE for which a rank is being generated. For example, an entity rank for a recreational location or travel destination (e.g., a ski area, a park, a resort, a beach, etc.) may be generated using a different algorithm or weighting of user actions/references than that for a restaurant, a service provider (e.g., a plumber, car repair shop, airline, etc.), a product (e.g., a book, a car, a vacuum cleaner, a self-sealing tubeless mountain bike tire, a movie, a DVD, etc.), or a musical act (e.g., a musician, a band or a play).

The entity rank generation operation 908 may take into account the type of user actions, if they are known. For example, repeat purchases by the same user may be weighted more highly than the same number of purchases by different users. Additionally, merchandise returns or repairs may have a negative effect on the entity rank of the seller of the merchandise or the product being repaired. Time spent at a location may also be tracked as a specific user action and used as a surrogate measure of a user's opinion of the business, service or experience associated with the location.

In addition, negative and positive comments as determined from an inspection of the context of interpersonal communications may be used to negatively or positively adjust the entity rank. For example, the statement in an email, "My Chevy pickup is terrible—I need to get something that doesn't fall apart" may result in an entity rank for an RWE that represents Chevrolet trucks in general, as well as the RWE that represents the user's model and year of Chevrolet truck and the RWE the represents the actual truck the user drives, being reduced to reflect the user's negative opinion.

In the method 900 shown, a personal rank generation operation 910 is also provided that generates a personal rank for RWEs known to the system. In an embodiment, a personal rank may be generated for RWEs relative to a specified user or other RWE as discussed above. In such an operation 910, a determination may be made to identify the RWE and any related or proxy RWEs for which communications should be evaluated. For example, a personal rank of RWEs for a first user may take into account user actions and references in communications from the first user's social circle of friends and family. For business-related services, a personal rank may take into account the first user's co-workers preferences as indicated by prior communications. Once the set of the proxies to be used has been identified, the communications for those proxies are retrieved and analyzed independently to generate a rank of the all the RWEs in a manner similar to the entity rank generation operation 908. Thus, in an embodiment, generating a personal rank may be considered substantially the same process as generation of an entity rank, but only using a defined subset of communications from related RWEs rather than all communications from all RWEs.

In the embodiment shown, the flow chart illustrates that the entity rank and personal rank for each RWE are recalculated after receiving a new communication. In an alternative embodiment, the entity rank generation operation 908 and/or personal rank generation operation 910 may be performed periodically rather than being triggered by receipt of a communication. In yet another embodiment, the entity rank generation operation 908 and/or personal rank generation operation 910 may be performed on an as needed basis, such as when generating search results or other information for display to a user or use by another process on the W4 COMN, such as a recommendation service.

The entity ranks and personal ranks determined in method 900 may be used for any purpose in which is useful to know the level of interest in different RWEs by other RWEs. In the embodiment of the method 900 illustrated in FIG. 9, the entity ranks and personal ranks are used in a display operation 912 in order to modify how information about the RWEs is presented to users. One example of such a display operation 912 is that described with reference to FIG. 8 in which web page search results are presented to a user based on the entity rank and personal rank of the RWEs associated with the web pages in the results. Other embodiments of display operation 912 include displaying a list of RWEs ordered based on entity rank and/personal rank or transmitting a list of RWEs selected based on entity rank and/personal rank to some executing process that uses the listed RWEs as a starting point from which to make automated decisions related to selection of pricing or advertising. For example, the price charged for advertisements associated with web pages for RWEs that have an increasing entity rank may be automatically increased based on the evidence of new popularity of the RWE.

Many other uses of entity ranks and personal ranks may are possible. For example, the entity ranks and personal ranks of related RWEs may be used to automatically generate up-to-date "best of" listings of RWEs. In a travel context, a prospective travel to a destination could use entity ranks and personal ranks to identify a ranked listing of locations, businesses and other RWEs of personal and general interest at the destination.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure. For example, in the method 800 described with reference FIG. 8, the retrieve entity rank operation could be omitted in favor of using the only the personal rank. Alternatively, queries may be received in which the searching user indicates that only entity and or personal rank should be used when generating and displaying search results. Such a query, for example, being for a listing of RWEs that match the query as opposed to a list of web pages. Numerous other changes may be made that will readily suggest themselves to those skilled in the art and which are encompassed in the spirit of the invention disclosed and as defined in the appended claims.

What is claimed is:

1. A method of presenting results of a web page query comprising:
   generating, via a computing device, a results set of web pages matching the web page query, each web page associated with a web rank;
   for each web page referring to one of a plurality of predefined entities in the content of the web page, retrieving, via the computing device, an entity rank for the web page, the retrieved entity rank being an entity rank associated with the one predefined entity referred to in the content of the web page;
   collecting data indicative of user actions from a plurality of user proxy devices;
   identifying, based on the data, a plurality of user actions;
   for each user action, identifying a user and at least one of the plurality of predefined entities associated with the user action;
   generating an entity rank for each of the plurality of predefined entities based on a number of user actions associated with each predefined entity; and
   generating a personal rank for each of the plurality of predefined entities relative to the first user based on a number of user actions associated with the first user and each predefined entity; and
   transmitting the results set of web pages based on the web rank and entity rank for each web page and user action to a user computer device for visible display on a display of the user computer device.

2. The method of claim 1 further comprising:
   for each web page in the results set, generating the web rank based on similarity between the web page query and the content of the web page;
   generating a combined rank for each web page in the results set from the web rank and entity rank for each web page; and
   transmitting the results set of web pages based on the combined rank for each web page in the results set to the user computer device for visible display on the display of the user computer device.

3. The method of claim 1 further comprising:
   collecting data indicative of user actions from a plurality of user proxy devices; and
   generating an entity rank for each of the plurality of predefined entities based on data from the user proxy devices.

4. The method of claim 3 further comprising:
   collecting the data from messages transmitted between two user proxy devices;
   identifying, based on the data, a plurality of user actions;
   for each user action, identifying a user and at least one of the plurality of predefined entities associated with the user action; and
   generating the entity rank for each of the plurality of predefined entities based on a number of user actions associated with each predefined entity.

5. The method of claim 3 further comprising:
   identifying a first user action, the data corresponding to the first user action including an identification of a first location;
   determining that the first location is a first predefined entity; and
   associating the first user action with the first predefined entity.

6. The method of claim 3 further comprising:
   identifying a second user action, the data corresponding to the second user action including an identification of an event defined by a second location and a time;
   determining that the event is a second predefined entity; and
   associating the first user action with the second predefined entity.

7. The method of claim 3 further comprising:
identifying a third user action, the data corresponding to the third user action including an identification of a business;
determining that the business is a third predefined entity; and
associating the third user action with the third predefined entity.

8. The method of claim 1 further comprising:
identifying a first user that transmitted the web page query; and
for each web page referring to one of the plurality of predefined entities in the content of the web page, retrieving the personal rank for the web page, the personal rank being a personal rank for the predefined entity referred to in the content of the web page relative to the first user; and
displaying the results set of web pages based on the web rank, personal rank and entity rank for each web page.

9. A computer-readable storage medium tangibly encoding computer-readable instructions, which when executed by a computer, perform a method comprising:
defining a plurality of physical entities;
analyzing communications from entity proxies for references to one or more of the defined plurality of physical entities;
generating a relative entity rank for each physical entity based on the references contained in the communications from the entity proxies;
collecting data indicative of user actions from a plurality of user proxy devices;
identifying, based on the data, a plurality of user actions;
for each user action, identifying a user and at least one of the plurality of predefined entities associated with the user action;
generating an entity rank for each of the plurality of predefined entities based on a number of user actions associated with each predefined entity; and
generating a personal rank for each of the plurality of predefined entities relative to the first user based on a number of user actions associated with the first user and each predefined entity; and
presenting information to a first user about one or more of the plurality of physical entities based on the relative entity rank, personal rank and entity rank of the one or more physical entities.

10. The computer-readable storage medium of claim 9, wherein defining a plurality of physical entities further comprises:
monitoring communications over at least one electronic communication channel from a plurality of devices;
defining each device as one of the plurality of physical entities;
defining at least one person, place or thing that is not directly capable of transmitting communications over at least one electronic communication channel as one of the plurality of physical entities; and
identifying, for each physical entity that is not a device directly capable of transmitting communications, at least one entity proxy for that physical entity;
wherein defining a plurality of physical entities further comprises:
assigning a unique identifier to each physical entity; and
generating, for each physical entity, a entity definition having one or more parameters and entity proxy identifiers, wherein the parameters are selected from spatial parameters, temporal parameters, social parameters, keywords, and electronic entity identifiers, and the entity proxy identifiers are the unique identifiers for each physical entity that is an entity proxy for the physical entity defined by the entity definition.

11. The computer-readable storage medium of claim 10, wherein analyzing communications further comprises:
searching the communications for data matching one or more entity definitions.

12. The computer-readable storage medium of claim 9, wherein generating a relative entity rank further comprises:
calculating the relative entity rank for each physical entity based on:
how many references to each physical entity are contained in the analyzed communications, or
how many communications contain references to each physical entity.

13. The computer-readable storage medium of claim 9, wherein the method further comprises:
defining each identifiable person and each identifiable location referenced in the communications as one of the plurality of physical entities;
generating, for the first user, a personal entity rank for each physical entity based on the references contained in communications associated with the first user; and
presenting information to the first user about one or more of the plurality of physical entities based on the relative entity rank and the personal entity rank of the one or more physical entities.

14. A computing system comprising:
plurality of processors;
a web rank module implemented by at least one of said plurality of processors that collects web data produced by user interactions with web pages from user proxy devices;
the web rank module identifies, based on the user interactions, a plurality of user actions, wherein for each user action, the web rank module identifies a user and at least one of a plurality of predefined real-world entities (RWEs) associated with the user action;
a world rank module implemented by at least one of said plurality of processors that generates an entity rank for each of a set of the predefined real-world entities (RWEs), said entity rank based on a number of user actions associated with each predefined entity;
an attention rank module implemented by at least one of said plurality of processors that generates an attention rank for at least one web page and user interactions based on the web rank of the web page and entity rank of at least one RWE associated with the web page; and
the attention rank module generates a personal rank for each of the RWEs relative to a user based on a number of user actions associated with the user and each RWE.

15. The computing system of claim 14 further comprising:
an entity data collection module connected to the world rank module that collects user data from communications transmitted by the RWEs including identities of users associated with the communications, a number of communications and communication channels associated with the communications; and
wherein the world rank module generates the entity rank by mapping the user data.

16. The computing system of claim 14 further comprising:
a web page association module connected to the attention rank module that, based on the content of a web page, identifies at least one RWE as associated with the web page; and
wherein the attention rank module when generating an attention rank for one more of a set of web pages receives from the web page association module an identification of the at least one RWE, if any, associated with each of the set of web pages.

17. The computing system of claim 14 further comprising:
a web search query engine connected to the attention rank module that retrieves the attention rank for each web page in a web page query result and presents the web page query result based on the attention rank of the web pages.

18. The computing system of claim 14 further comprising:
a personal rank module that generates, for a first RWE, a personal rank for each of the set of predefined RWEs relative to the first RWE; and
wherein the attention rank module, in response to a request associated with the first RWE, generates the attention rank for the at least one web page based on the web rank of the web page, the entity rank of the at least one RWE associated with the web page, and the personal rank of the at least one RWE associated with the web page.

19. The computing system of claim 14, wherein each RWE is one of a user, a user proxy device, a location, a legal entity, or a physical object.

* * * * *